US011699810B2

(12) United States Patent
Vereecken et al.

(10) Patent No.: US 11,699,810 B2
(45) Date of Patent: Jul. 11, 2023

(54) SOLID NANOCOMPOSITE ELECTROLYTE MATERIALS

(71) Applicants: IMEC VZW, Leuven (BE); Katholieke Universiteit Leuven, KU LEUVEN R&D, Leuven (BE)

(72) Inventors: Philippe Vereecken, Liège 1 (BE); Xubin Chen, Leuven (BE); Maarten Mees, Kessel-Lo (BE)

(73) Assignees: IMEC VZW, Leuven (BE); Katholieke Universiteit Leuven, KU LEUVEN R&D, Leuven (BE)

( * ) Notice: Subject to any disclaimer, the term of this patent is extended or adjusted under 35 U.S.C. 154(b) by 516 days.

(21) Appl. No.: 16/607,126

(22) PCT Filed: Feb. 20, 2018

(86) PCT No.: PCT/EP2018/054054
§ 371 (c)(1),
(2) Date: Oct. 22, 2019

(87) PCT Pub. No.: WO2018/197073
PCT Pub. Date: Nov. 1, 2018

(65) Prior Publication Data
US 2021/0265654 A1    Aug. 26, 2021

(30) Foreign Application Priority Data

Apr. 24, 2017    (EP) .................................... 17167742

(51) Int. Cl.
*H01M 10/0525*    (2010.01)
*H01M 10/0562*    (2010.01)

(52) U.S. Cl.
CPC ... *H01M 10/0562* (2013.01); *H01M 10/0525* (2013.01); *H01M 2300/0071* (2013.01); *H01M 2300/0082* (2013.01)

(58) Field of Classification Search
CPC .......... H01M 10/0562; H01M 10/0525; H01M 2300/0071; H01M 2300/0082
See application file for complete search history.

(56) References Cited

U.S. PATENT DOCUMENTS

| 6,275,317 | B1 | 8/2001 | Doerr et al. |
| 8,119,273 | B1 * | 2/2012 | Gerald, II ........... H01M 50/403 |
| | | | 429/129 |

(Continued)

FOREIGN PATENT DOCUMENTS

| CN | 106935776 A | 7/2017 |
| EP | 2814091 A1 | 12/2014 |

(Continued)

OTHER PUBLICATIONS

PCT International Search Report and Written Opinion, PCT International Application No. PCT/EP2018/054054, dated May 28, 2018, 13 pages.

(Continued)

*Primary Examiner* — Osei K Amponsah
(74) *Attorney, Agent, or Firm* — McDonnell Boehnen Hulbert & Berghoff LLP

(57) ABSTRACT

A solid nanocomposite electrolyte material comprising a mesoporous dielectric material comprising a plurality of interconnected pores and an electrolyte layer covering inner surfaces of the mesoporous dielectric material. The electrolyte layer comprises: a first layer comprising a first dipolar compound or a first ionic compound, the first dipolar or ionic compound comprising a first pole of a first polarity and a second pole of a second polarity opposite to the first polarity, wherein the first layer is adsorbed on the inner surfaces with the first pole facing the inner surfaces; and a second layer covering the first layer, the second layer comprising a second ionic compound or a salt comprising first ions of the first (Continued)

polarity and second ions of the second polarity, wherein the first ions of the ionic compound or salt are bound to the first layer.

20 Claims, 7 Drawing Sheets

(56) References Cited

U.S. PATENT DOCUMENTS

| | | | |
|---|---|---|---|
| 8,915,975 B2 | 12/2014 | Le Bideau et al. | |
| 10,345,603 B2 | 7/2019 | Nakanishi | |
| 10,601,200 B2 | 3/2020 | Enya et al. | |
| 2006/0008700 A1 | 1/2006 | Yong et al. | |
| 2010/0248025 A1 | 9/2010 | Kimura et al. | |
| 2014/0363744 A1* | 12/2014 | Vereecken | H01M 10/058 423/625 |
| 2014/0377621 A1 | 12/2014 | Hanyu et al. | |
| 2015/0056517 A1 | 2/2015 | Zhou et al. | |
| 2015/0194701 A1 | 7/2015 | Kim et al. | |
| 2016/0164139 A1 | 6/2016 | Ayme-Perrot et al. | |
| 2016/0315349 A1 | 10/2016 | Horowitz et al. | |
| 2017/0084949 A1* | 3/2017 | Yokoyama | H01M 10/052 |
| 2017/0133714 A1 | 5/2017 | Ayme-Perrot et al. | |
| 2017/0288280 A1 | 10/2017 | Shi et al. | |
| 2018/0337426 A1 | 11/2018 | Matsumoto et al. | |
| 2019/0393548 A1 | 12/2019 | Vereecken et al. | |
| 2020/0006807 A1 | 1/2020 | Chen et al. | |

FOREIGN PATENT DOCUMENTS

| | | | |
|---|---|---|---|
| EP | 3165559 | A1 | 5/2017 |
| JP | 2001228372 | A | 8/2001 |
| JP | 2002040350 | A | 2/2002 |
| JP | 2008060272 | A | 3/2008 |
| JP | 2008-130229 | A | 6/2008 |
| JP | 2008130611 | A | 6/2008 |
| JP | 2009076402 | A | 4/2009 |
| JP | 2010-113939 | A | 5/2010 |
| JP | 2010-225511 | A | 10/2010 |
| JP | 2011-113906 | A | 6/2011 |
| JP | 2011-134459 | A | 7/2011 |
| JP | 2012074351 | A | 4/2012 |
| JP | 2012-518248 | A | 8/2012 |
| JP | 2014-524917 | A | 9/2014 |
| JP | 2014-241275 | A | 12/2014 |
| JP | 2012243743 | A | 6/2015 |
| JP | 2016508279 | A | 3/2016 |
| JP | 2016096219 | A | 5/2016 |
| JP | 2017-105987 | A | 6/2017 |
| JP | 2017-130448 | A | 7/2017 |
| KR | 10-2017-0053139 | A | 5/2017 |
| WO | 2011024848 | A1 | 3/2011 |
| WO | 2013/009731 | A2 | 1/2013 |
| WO | 2013/051302 | A1 | 4/2013 |
| WO | 2015/089498 | A1 | 6/2015 |
| WO | 2018/074174 | A1 | 4/2018 |
| WO | 2018/110172 | A1 | 6/2018 |

OTHER PUBLICATIONS

Extended European Search Report and Written Opinion, Application No. EP18874328.0, dated Nov. 18, 2020, 7 pages.

PCT International Search Report and Written Opinion, Application No. PCT/JP2018/040579, dated Jan. 29, 2019, 13 pages. (English language translation included.).

Extended European Search Report dated Oct. 19, 2020 in European Application No. 18872697.0.

Le Bideau et al., "Ionogels, ionic liquid base hybrid materials", Chemical Society Reviews, vol. 40, No. 2, pp. 907-925, Jan. 12, 2011, XP055352709.

PCT International Search Report issued in International Patent Application No. PCT/JP2017/040578, dated Feb. 6, 2018, with English translation.

Tan, G., et al., "Solid-State Li-Ion Batteries Using Fast, Stable, Glassy Nanocomposite Electrolytes for Good Safety and Long Cycle-Life," American Chemical Society, ACS Publications, NANO Letters, 2016, vol. 16, pp. 1960-1968.

Unemoto, A., et al., "Electrical conductivity and dynamics of quasi-solidified lithium-ion conducting ionic liquid at oxide particle surfaces," Institute of Multidisciplnary Research for Advanced Materials, Tohoku University, Elsevier, Solid State Ionics, vol. 201, 2011, pp. 11-20.

Office Action issued in U.S. Appl. No. 16/481,814 dated Mar. 4, 2022 (12 pages).

Horowitz, et al., "High-Performance, Mechanically Compliant Silica-Based Ionogels for Electrical Energy Storage Applications," J. Mater. Chem., 2012, vol. 22, pp. 16534-16539.

Extended European Search Report from the European patent office, dated Oct. 19, 2020, for European Application No. 18872697.0, based on PCT/JP2018/040579, pp. 1-8.

* cited by examiner

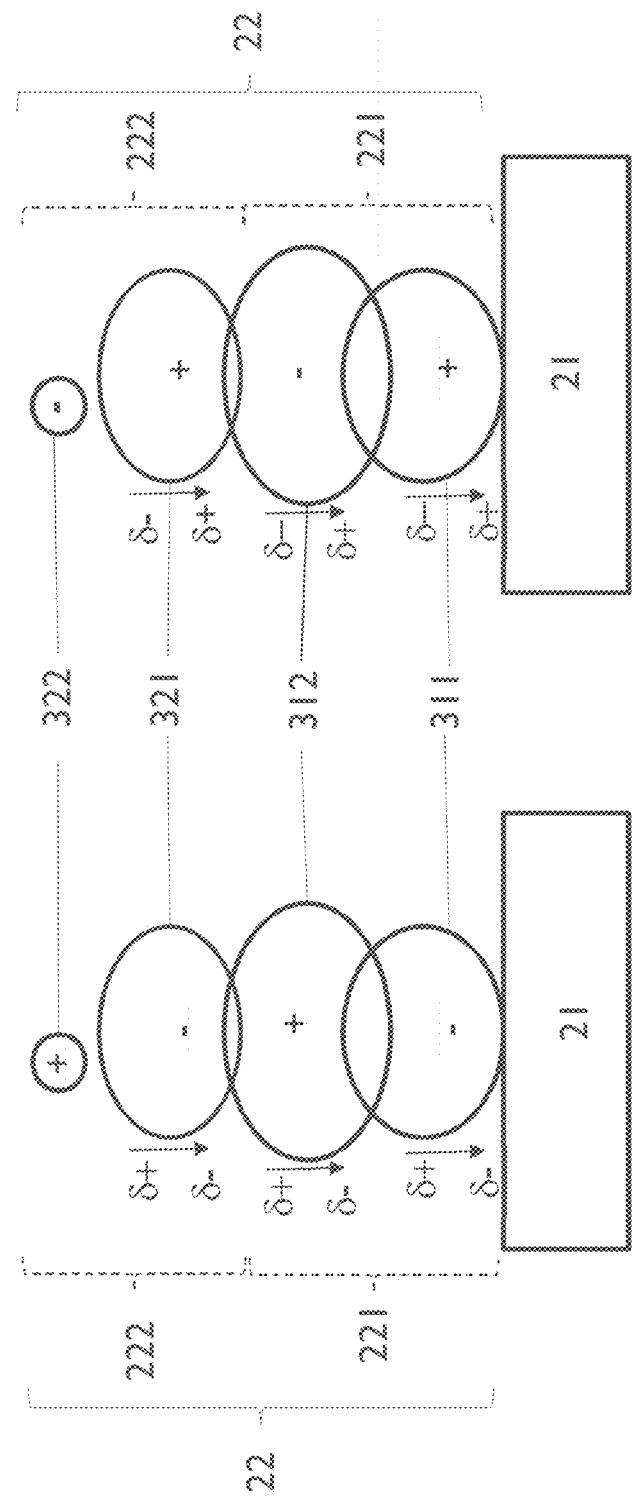

SOLID NANOCOMPOSITE ELECTROLYTE MATERIALS

This application is a U.S. national phase application of international application no. PCT/EP2018/054054 filed on Feb. 20, 2018, which claims priority to European patent application no. EP 17167742.0 filed on Apr. 24, 2017, the contents of both being incorporated by reference in their entirety.

FIELD

The present disclosure relates to solid nanocomposite electrolyte materials, to solid nanocomposite electrolyte layers, to composite ion insertion electrodes and to solid-state ion insertion battery cells and batteries comprising such solid nanocomposite electrolyte layer and/or composite ion insertion electrode.

The present disclosure further relates to methods for forming solid nanocomposite electrolyte materials and layers.

STATE OF THE ART

A battery cell comprises a positive electrode or cathode, a negative electrode or anode and an electrolyte layer therein between. Solid electrolytes are preferred for reasons of increased safety, and for enhanced energy density, power density and charging rate.

The main requirements for such a solid electrolyte are a high ionic conductivity, e.g. higher than 1 mS/cm, preferably higher than 10 mS/cm, and good chemical and mechanical stability. Chemical stability is typically indicated by the electrochemical window, which defines the negative and positive voltage limits of the electrolyte and thus the choice of active electrode material chemistry. Mechanical stability entails the mechanical support to keep the electrodes well separated physically and electrically.

The ionic conductivity, and thus the cell capacity and charging rate, may be increased by using a nanocomposite electrolyte, comprising a nanostructured electrically insulating material such as an oxide, e.g. a thin film porous material or a nanoparticle-based material, and an ionic conductor such as a salt (e.g. Li salt), the ionic conductor being present at inner surfaces of the nanostructured material. In such a structure, an enhanced ionic conductivity may in principle be obtained at the interface between the ionic conductor and the insulating material.

Different types of solid (nano)composite electrolyte materials have been proposed as potential candidates for use in solid-state ion insertion batteries, such as for example silica/ionic-liquid (IL) solid composite electrolytes (SCE). Such solid composite electrolytes may potentially offer a good ionic conductivity, for example higher than 0.1 mS/cm, and a good electrochemical window. However, it was observed that in practice the ionic conductivity of such composite electrolyte materials is always lower than the bulk conductivity of the corresponding ionic liquid electrolyte.

Silica/ionic-liquid solid composite electrolytes may for example be fabricated by means of a sol-gel method. In such a sol-gel method, an electrolyte precursor solution is converted into a gel by a chemical gelification process and subsequently to a solid material by a drying and curing process. For the formation of a silica/ionic-liquid solid composite electrolyte using a sol-gel method, typically an organic acid or a combination of an organic acid and a hydrochloride acid are used as a catalyst for the hydrolysis and poly-condensation of a silicon precursor in the solution, to form the silica. However, because of the presence of an acid, such a solution would be chemically incompatible with some electrodes used in ion insertion solid-state batteries, such as for example $LiMn_2O_4$ or $Li_4Ti_5O_{12}$ electrodes in case of a lithium ion battery. A chemical reaction between the acid and the electrode material would lead to failure of the battery.

Hence, there is a need for nanocomposite electrolyte materials, preferably solid nanocomposite electrolyte materials, that have an improved ionic conductivity in practice. Fabrication methods of such improved (solid) nanocomposite electrolyte materials are preferably compatible with electrodes typically used in ion insertion solid-state batteries, such as for example $LiMn_2O_4$ or $Li_4Ti_5O_{12}$ electrodes in case of a lithium ion battery.

SUMMARY

It is an object of the present disclosure to provide a solid nanocomposite electrolyte material having a good ionic conductivity, suitable for integration in solid-state ion insertion battery cells and batteries. It is an advantage of embodiments of the present disclosure to provide a solid nanocomposite electrolyte material having an ionic conductivity that is larger than the bulk ionic conductivity of a corresponding electrolyte material, i.e. of the electrolyte material that is part of the solid nanocomposite electrolyte material.

It is an object of the present disclosure to provide a solid nanocomposite layer comprising such solid nanocomposite electrolyte material. It is an object of the present disclosure to provide a composite electrode comprising such solid nanocomposite electrolyte material. It is an object of the present disclosure to provides battery cells and batteries comprising such solid nanocomposite electrolyte material.

It is an object of the present disclosure to provide a method for forming a solid nanocomposite electrolyte material having a good ionic conductivity that is suitable for integration in solid-state ion insertion battery cells and batteries. The method is preferably compatible with other materials used for forming such solid-state ion insertion battery cells and batteries, such as for example with materials used for forming electrodes. More in particular, it is an object of the present disclosure to provide a solution based method for forming a solid nanocomposite electrolyte material having a good ionic conductivity. Preferably the method is compatible with other materials used for forming such solid-state ion insertion battery cells and batteries.

These and other objectives are at least partially met by the disclosure as defined in the independent claims. Preferred embodiments are set out in the dependent claims.

According to a first aspect, the present disclosure is related to a solid nanocomposite electrolyte material, wherein the solid nanocomposite electrolyte material comprises: a mesoporous dielectric material comprising a plurality of interconnected pores, the plurality of interconnected pores defining inner surfaces of the nanoporous dielectric material; and an electrolyte layer covering the inner surfaces, wherein the electrolyte layer comprises: a first layer comprising a first dipolar compound or a first ionic compound, the first dipolar or ionic compound comprising a first pole of a first polarity and a second pole of a second polarity opposite to the first polarity, wherein the first layer is adsorbed on the inner surfaces with the first pole facing the inner surfaces, thereby introducing or modifying a charge delocalization in the first dipolar or ionic compound and introducing or modifying a molecular dipole moment over the first dipolar or ionic compound; and a second layer covering the first layer, the second layer comprising a second ionic compound or a salt comprising first ions of the first polarity and second ions of the second polarity, wherein the first ions of the second ionic compound or salt are bound to the first layer, thereby weakening a bond between the first ions and the second ions and enhancing a mobility of the second ions; and wherein the electrolyte layer is a substantially continuous, uninterrupted layer throughout the material.

In embodiments according to the first aspect of the present disclosure the first dipolar compound or first ionic compound may for example be an organic salt, an organic complex, a eutectic salt or a metal salt. For example, the first dipolar compound or first ionic compound may be an ionic liquid. It may for example comprise a cation such as 1-Butyl-1-methyl pyrrolidinium ($BMP^+$), 1-butyl-3-methyl imidazolium ($BMI^+$); 1.2-dimethyl-3-propyl imidazolium ($DMPI^+$); 1,2-diethyl-3,5-dimethyl imidazolium ($DEDMI^+$), trimethyl-n-hexyl ammonium ($TMHA^+$), N-butyl-N-methyl pyrrolidinium ($PYR^+$), N-methyl-N-propyl piperidinium ($PIP^+$) or N-ethyl-N-methyl morpholidinium ($PYR^+$), and/or an anion such as bis(trifluoromethanesulfonyl)imide ($TFSI^-$), bis(pentafluoroethanesulfonyl)imide ($BETI^-$) or 2,2,2-trifluoro-N-(trifluoromethanesulfonyl)acetamide (TSAC).

In embodiments according to the first aspect of the present disclosure the first polarity may be a negative polarity and the second polarity may be a positive polarity, or vice versa, the first polarity may be a positive polarity and the second polarity may be a negative polarity.

In embodiments according to the first aspect of the present disclosure wherein the first polarity is a negative polarity and the second polarity is a positive polarity, the second ion of the second polarity of the second layer may for example be a metal cation, such as a metal cation selected from $Li^+$, $Na^+$, $K^+$, $Ca^{2+}$, $Mg^{2+}$, $Cu^{2+}$, $Al^{3+}$, $Co^{2+}$ and $Ni^{2+}$. In such embodiments the first ion of the first polarity of the second layer may for example be a large depolarized anion, such as an anion selected from $ClO_4^-$, $BF_4^-$, $PF_6^-$, $TFSI^-$ and $BETI^-$.

In embodiments according to the first aspect of the present disclosure the mesoporous dielectric material may for example comprise silicon oxide, aluminum oxide or a mixture thereof. In embodiments the mesoporous dielectric material may for example have a porosity in the range between 25% and 90%. The plurality of interconnected pores may for example have a diameter in the range between 2 nm and 50 nm. The mesoporous dielectric material may further comprise a plurality of micropores, the micropores having for example a diameter smaller than 2 nm.

It is an advantage of embodiments of the solid nanocomposite electrolyte materials according to the first aspect of the present disclosure that these materials may have an ionic conductivity that is higher than the bulk ionic conductivity of the electrolyte material covering the inner surfaces. This enhanced ionic conductivity is related to the presence of the first layer comprising a first compound (first dipolar compound or first ionic compound) having a first pole of a first polarity and a second pole of a second, opposite, polarity, wherein the first layer is adsorbed on the inner surfaces with the first pole facing the inner surfaces, thereby introducing or modifying a molecular dipole moment over the first compound. Because of the presence of such a first layer in between the inner surfaces and the second layer, the second layer comprising a second compound (second ionic compound or salt) comprising first ions of the first polarity and second ions of the second polarity and being bound to the first layer by its first ions of the first polarity (i.e. the second layer being substantially fixed by its first ions to the first layer), the second ions of the second compound may become less strongly bonded to the first ions of the second compound, such that these second ions can move more freely, resulting in an enhanced ionic conductivity of these second ions. Therefore, the first layer can be considered as an 'ionic conduction promotor' for the second ions of the second ionic compound or salt being part of the second layer. For example, in embodiments of the present disclosure the first layer ('ionic conduction promotor') may comprise an ionic liquid and the second layer may comprise a salt, such as for example a lithium salt. In this example, the effect of the presence of the ionic liquid (having a molecular dipole moment) in between the dielectric material inner surfaces and the lithium salt is that the anion of the lithium salt is fixed to the ionic liquid layer adsorbed on the inner surfaces of the dielectric material. This makes the $Li^+$ cations of the lithium salt becoming less strongly bonded to the anions of the lithium salt, resulting in an easier, more free movement of the $Li^+$ cations through the electrolyte material, and therefore an enhancement of the $Li^+$ ionic conductivity of the material. The presence of the first layer as described above may further lead to an increase of the transference or transport number of the second ions, such as for example $Li^+$ ions. The transference or transport number of the second ions (of the second compound, for example a salt such as a lithium salt) is the fraction of the total ionic current through the electrolyte that is carried by these second ions (e.g. $Li^+$ cations), i.e. the ions that provide the ionic conductivity. Another fraction of the total current may for example be carried by the first ions of the compound, e.g. salt.

In embodiments according to the first aspect of the present disclosure the solid nanocomposite electrolyte material preferably has a composition having an amount of the first ionic compound or first dipolar compound and the second ionic compound or salt relative to the dielectric material that is higher than a predetermined threshold value, wherein the threshold value is predetermined based on a selection of compositions for which an ionic conductivity of the solid nanocomposite electrolyte material is higher than an ionic conductivity of a bulk electrolyte layer only consisting of the material of the electrolyte layer covering the inner surfaces of the plurality of interconnected pores.

It is an advantage of embodiments of the solid nanocomposite electrolyte materials according to the first aspect of the present disclosure that they may have a high ionic conductivity, such as for example an ionic conductivity higher than 10 mS/cm. When used as an electrolyte layer in a solid-state ion insertion battery cell or battery, the higher ionic conductivity may lead to faster charging rates of the battery cell or battery. When used as an electrolyte layer in a composite electrode of a solid-state ion insertion battery cell or battery, the higher ionic conductivity may allow increasing an electrode thickness, resulting in an enhanced capacity, an enhanced energy density and an enhanced power density of the battery cell or battery.

In embodiments of the first aspect of the present disclosure the electrolyte layer of the solid nanocomposite electrolyte material may further comprise at least one additional layer covering the second layer, the at least one additional layer being a solvent and a conductor for the second ions of the second ionic compound or salt of the second layer, which is advantageous in that this at least one additional layer acts as a 'solvent' layer promoting and enhancing movement of the second ions of the second layer, and therefore further enhancing the ionic conductivity of the composite electrolyte material. In embodiments the at least one additional layer may for example comprise the same second ionic compound or salt as the second layer.

According to a second aspect, the present disclosure is related to a solid nanocomposite electrolyte layer comprising a solid nanocomposite electrolyte material according to an embodiment of the first aspect of the present disclosure.

In embodiments according to the second aspect of the present disclosure the solid nanocomposite electrolyte layer thus comprises a mesoporous dielectric material comprising a plurality of interconnected pores defining inner surfaces of the mesoporous dielectric material and an electrolyte layer covering the inner surfaces in accordance with the first aspect. The plurality of interconnected pores and the electrolyte layer may advantageously form a continuous path for ion conduction between a first surface of the solid nanocomposite electrolyte layer and a second, opposite surface of the solid nanocomposite electrolyte layer. This is advantageous in that, when the solid nanocomposite electrolyte layer of the second aspect is used as an electrolyte layer in a solid-state ion insertion battery cell or battery, a continuous, uninterrupted path for ionic conduction may be formed between a first electrode layer and a second electrode layer of the battery cell or battery, i.e. between electrodes of opposite polarity of the battery cell or battery. This is advantageous in that, when the solid nanocomposite electrolyte layer of the second aspect is used as an electrolyte layer in a composite electrode of a solid-state ion insertion battery cell or battery, a continuous, uninterrupted path for ionic conduction may be formed throughout the composite electrode.

In embodiments according to the second aspect of the present disclosure, the solid nanocomposite electrolyte layer may for example have an ionic conductivity higher than an ionic conductivity of a bulk electrolyte layer only consisting of the material of the electrolyte layer covering the inner surfaces of the plurality of interconnected pores. For example, the solid nanocomposite electrolyte layer may have an ionic conductivity higher than 1 mS/cm. This is advantageous in that, when the solid nanocomposite electrolyte layer of the second aspect is used as an electrolyte layer in a solid-state ion insertion battery cell or battery, the higher ionic conductivity may lead to faster charging rates of the battery cell or battery. This is advantageous in that, when the solid nanocomposite electrolyte layer of the second aspect is used as an electrolyte layer in a composite electrode of a solid-state ion insertion battery cell or battery, the higher ionic conductivity may allow increasing an electrode thickness, resulting in an enhanced capacity, an enhanced energy density and an enhanced power density of the battery cell or battery.

In embodiments according to the second aspect of the present disclosure the solid nanocomposite electrolyte layer preferably has a composition having an amount of the first ionic compound or first dipolar compound and the second ionic compound or salt relative to the dielectric material that is higher than a predetermined threshold value, wherein the threshold value is predetermined based on a selection of compositions for which an ionic conductivity of the solid nanocomposite electrolyte material is higher than an ionic conductivity of a bulk electrolyte layer only consisting of the material of the electrolyte layer covering the inner surfaces of the plurality of interconnected pores.

According to a third aspect, the present disclosure is related to a composite ion insertion electrode comprising a mixture of an active electrode material and a solid nanocomposite electrolyte material according to an embodiment of the first aspect of the present disclosure.

It is an advantage of embodiments of the composite ion insertion electrode according to the third aspect that it may have an enhanced ionic conductivity, which may allow increasing an electrode thickness, resulting in an enhanced capacity, an enhanced energy density and an enhanced power density of a battery cell or battery comprising such a composite ion insertion electrode.

According to a fourth aspect, the present disclosure relates to a solid-state battery cell comprising a solid nanocomposite electrolyte layer according to an embodiment of the second aspect of the present disclosure. The present disclosure further provides a solid-state battery comprising at least one solid-state battery cell in accordance with the fourth aspect.

It is an advantage of the solid-state battery cells and solid-state batteries according to embodiments of the fourth aspect that they may have an enhanced, e.g. fast charging rate.

According to a fifth aspect, the present disclosure relates to a solid-state battery cell comprising a composite ion insertion electrode according to an embodiment of the third aspect of the present disclosure. The present disclosure further provides a solid-state battery comprising at least one solid-state battery cell in accordance with the fifth aspect.

It is an advantage of the solid-state battery cells and solid-state batteries according to embodiments of the fifth aspect that they may have an enhanced capacity, an enhanced energy density and/or an enhanced power density.

According to a sixth aspect, the present disclosure provides a method for forming a solid nanocomposite electrolyte material according to embodiments of the first aspect of the present disclosure, wherein the method for forming the solid nanocomposite electrolyte material comprises: obtaining a solution comprising a dielectric material precursor, a first dipolar compound or a first ionic compound, a second ionic compound or a salt, deionized water and an alcohol; and converting the solution into a solid material by inducing gelification of the solution, thereby forming a gel and afterwards drying the gel to form the solid nanocomposite electrolyte material.

In embodiments according to the sixth aspect of the present disclosure the dielectric material precursor may for example be a silica precursor or an alumina precursor or a mixture thereof; the first dipolar compound or first ionic compound may for example be an ionic liquid; and the second ionic compound or salt may for example comprise a metal salt, the metal salt comprising a metal cation, such as for example a metal cation selected from $Li^+$, $Na^+$, $K^+$, $Ca^{2+}$, $Mg^{2+}$, $Cu^{2+}$, $Al^{3+}$, $Co^{2+}$ and $Ni^{2+}$, and a large depolarized anion, such as for example a large depolarized anion selected from $ClO_4^-$, $BF_4^-$, $PF_6^-$, $TFSI^-$ and $BETI^-$.

In embodiments according to the sixth aspect of the present disclosure a molar ratio between the ionic liquid and the silica or alumina precursor or mixture thereof may for example be in the range between 0.1 and 2; a volume ratio between the deionized water and the silica or alumina precursor or mixture thereof may for example be substantially equal to 1 (for instance it may be from 0.9 to 1.1); a molar ratio between the metal salt and the ionic liquid may for example be in the range between 0.1 and 1; and a weight ratio between the ionic liquid and the alcohol may for example be in the range between 0.1 and 2.

It is an advantage of embodiments of the method for forming the solid nanocomposite electrolyte material according to the sixth aspect that it consists of a single fabrication process, more in particular a single sol-gel fabrication process, that results in a simultaneous formation of the mesoporous dielectric material and the electrolyte layer covering its inner surfaces.

It is an advantage of embodiments of the method for forming the solid nanocomposite electrolyte material according to the sixth aspect of the present disclosure that it uses a wet precursor. When fabricating a composite electrode comprising a solid nanocomposite electrolyte material formed in accordance with an embodiment of the sixth aspect, the use of a wet precursor allows easy introduction of the precursor inside pores of a porous layer comprising an active electrode material, and, after introduction of the precursor inside these pores, curing of the wet precursor to thereby form the solid nanocomposite electrolyte material inside the pores of the porous layer comprising the active electrode material. This may advantageously result in an integrated composite electrode layer comprising the active electrode material embedded in the nanocomposite electrolyte material. It may advantageously result in a compact electrode formulation with a reduced porosity and a good all-around contact between the active electrode material and the electrolyte material. When using such a composite electrode in a battery cell or in a battery, this may advantageously lead to an enhanced energy density and an enhanced power density of the battery cell or battery.

Particular and preferred aspects of the disclosure are set out in the accompanying independent and dependent claims. Features from the dependent claims may be combined with features of the independent claims and with features of other dependent claims as appropriate and not merely as explicitly set out in the claims.

The above and other characteristics, features and advantages of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

BRIEF DESCRIPTION OF THE FIGURES

FIG. 3 is a schematic representation of a dielectric layer covered with an electrolyte layer comprising a stack of a first layer and a second layer, illustrating charge delocalization in an embodiment with a cationic conductor.

FIG. 4 is a schematic representation of a dielectric layer covered with an electrolyte layer comprising a stack of a first layer and a second layer, illustrating charge delocalization in an embodiment with an anionic conductor.

Figure 1:
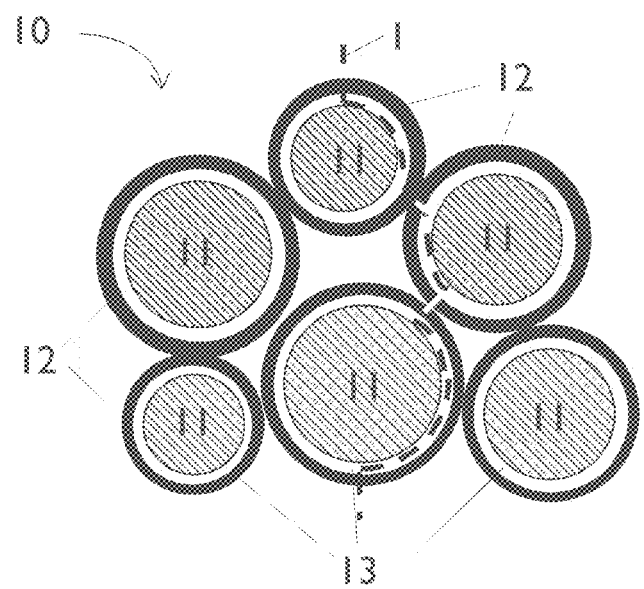
FIG. 1 schematically illustrates a structure of a particle-based composite electrolyte material according to the prior art.

In the different figures, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

The following terms are provided solely to aid in the understanding of the disclosure.

In the context of the present disclosure, a battery cell is a structure comprising two electrode layers with an electrolyte layer in between, i.e. a structure comprising a first electrode layer/electrolyte layer/second electrode layer stack. A battery may comprise a single battery cell or it may comprise a plurality of, e.g. at least two, battery cells. A battery may comprise two or more battery cells connected in series or in parallel, or a combination of series and parallel connected battery cells.

In the context of the present disclosure, an ion insertion battery cell is a battery cell comprising electrodes that can accept or release cations or anions during operation of the battery cell. Ion insertion battery cells can rely on the insertion/extraction of only one cation element, multiple cation elements, only anions or a mixture of anion and cation elements. An ion insertion battery cell further comprises an electrolyte that allows for ionic conduction of the respective ion used, while being (electro)chemically stable with regard to the used electrode materials.

In a rechargeable battery cell, each of the electrodes has a first polarity during the discharge (i.e. battery operation) and a second, opposite polarity during charging. Technically speaking however, the negative electrode is the anode during the discharge and the cathode during charging. Vice versa, the positive electrode is the cathode during discharge and the anode when charging the battery. In the context of the present disclosure, the terminology of the discharge (i.e. battery operation) is used. Herein further, with anode the negative electrode is meant and with cathode the positive electrode is meant. Through the disclosure, when referred to 'anode material' it is meant the negative electrode material and when referred to 'cathode material' it is meant the positive electrode material.

In the context of the present disclosure, a composite electrolyte material is a material comprising an electrically insulating material having a plurality of pores creating or defining a plurality of inner surfaces in the electrically insulating material, and a layer or layer stack covering the inner surfaces, the layer or layer stack comprising an electrolyte material.

In the context of the present disclosure, an active electrode material is a material that is a component of a battery electrode layer. In the active electrode material, the actual electrochemical transformation (change in valence or oxidation state of the atoms) takes place, which gives rise to storage of chemical energy in the electrode. An electrode layer is typically composed of the active electrode material and supporting material.

In the context of the present disclosure, a composite electrode is an electrode comprising a mixture of an active electrode material and an electrolyte material, and optionally a supporting material such as for example a binder or a non-active carbon. A solid composite electrode is an electrode comprising a mixture of an active electrode material and a solid electrolyte material, and optionally a supporting material such as for example a binder or a non-active carbon. Such composite electrode may be a thin film composite electrode layer or it may be a particle-based composite electrode layer, e.g. a blade coated layer or a pressed pellet layer.

In the context of the present disclosure, a nanoporous material is a material having pores with a pore size (e.g. pore diameter) smaller than 100 nm. Such nanoporous materials may further be classified into different categories, based on their pore size. In the context of the present disclosure the following terminology is used to describe the different nanoporous material categories: 'macroporous' for materials having a pore size between 50 nm and 100 nm, 'mesoporous' for materials having a pore size between 2 nm and 50 nm and 'microporous' for materials having a pore size lower than 2 nm.

In the context of the present disclosure the porosity of a material is the void fraction (fraction of 'empty' space) of the material. It is a fraction of the volume of voids or 'empty' spaces relative to the total material volume. The porosity of nanoporous materials may for example be determined by gas adsorption/desorption techniques.

In the context of the present disclosure, an ionic liquid electrolyte is an electrolyte comprising an ionic liquid and a salt comprising an ion, e.g. cation, for electrolyte conduction, such as for example a lithium salt comprising a $Li^+$ cation for electrolyte conduction, dissolved in the ionic liquid. The ionic liquid and the salt may comprise a same anion or they may comprise a different anion.

In the context of the present disclosure, an ionic liquid is an ionic organic compound or an organic salt in the liquid state. For ionic liquids that are liquid at room temperature, the term 'room temperature ionic liquid' may be used.

The disclosure will now be described by a detailed description of several embodiments of the disclosure. It is clear that other embodiments of the disclosure can be configured according to the knowledge of persons skilled in the art without departing from the technical teaching of the disclosure, the disclosure being limited only by the terms of the appended claims.

In a first aspect, the present disclosure provides solid nanocomposite electrolyte materials comprising a mesoporous dielectric material comprising a plurality of interconnected pores and a substantially continuous, uninterrupted electrolyte layer covering inner surfaces of the mesoporous dielectric material, wherein the electrolyte layer comprises: a first layer comprising a first dipolar compound or a first ionic compound, the first dipolar or ionic compound comprising a first pole of a first polarity and a second pole of a second polarity opposite to the first polarity, wherein the first layer is adsorbed on the inner surfaces with the first pole facing the inner surfaces, thereby (as a result of the adsorption) introducing or modifying a charge delocalization in the first dipolar or ionic compound and introducing or modifying a molecular dipole moment over the first dipolar or ionic compound; and a second layer covering the first layer, the second layer comprising a second ionic compound or a salt comprising first ions of the first polarity and second ions of the second polarity, wherein the first ions of the second ionic compound or salt are bound to the first layer, thereby (as a result of the binding) weakening a bond between the first ions and the second ions and enhancing a mobility of the second ions.

The first layer may function as an ionic conduction promotor for the second ions of the second polarity of the second layer. The second ions of the second polarity of the second layer provide electrolyte conduction of the solid nanocomposite electrolyte material.

In a solid nanocomposite electrolyte material according to embodiments of the first aspect of the present disclosure the electrolyte layer may form a coating on the inner surfaces of the mesoporous dielectric material without completely filling the plurality of interconnected pores, resulting in a porous solid nanocomposite electrolyte material. In a solid nanocomposite electrolyte material according to embodiments of the first aspect of the present disclosure the electrolyte layer may completely fill at least part of the plurality of interconnected pores.

Known solid nanocomposite electrolyte materials are solid materials that comprise a nanostructured electrically insulating material such as an oxide, e.g. a thin film porous material or a nanoparticle-based material, and a solid ionic conductor (solid electrolyte material), the ionic conductor being present at inner surfaces of the nanostructured material. In such a structure, an enhanced ionic conductivity (as compared to the ionic conductivity in the 'bulk' solid ionic conductor) may be obtained at an interface between the ionic conductor and the insulating material.

In order to reach a high ionic conductivity through a layer comprising such a solid nanocomposite electrolyte material, preferably a continuous interface is formed between the insulating material and the ionic conductor throughout the layer, i.e. the interface between the insulating material and the ionic conductor preferably extends from a first surface of the layer to a second, opposite surface of the layer, without any interruption in between. When using such a composite electrolyte material as an electrolyte layer in a solid-state ion insertion battery, this allows forming an uninterrupted path for ion conduction extending between the positive electrode and the negative electrode. When using such a composite electrolyte material as an electrolyte in a composite electrode of a solid-state ion insertion battery it may allow increasing the electrode thickness, resulting in an enhanced battery capacity.

Most state-of-the-art composite electrolyte materials are particle based. They comprise a plurality of (nano)particles comprising an electrically insulating material, a surface of the particles being at least partially covered with an electrolyte layer, which can be a solid layer or a liquid layer. This is schematically illustrated in FIG. 1, showing a structure of a particle based composite electrolyte material 10 comprising a plurality of particles 11, such as for example oxide particles, the surface of the particles 11 being covered with an electrolyte layer 12, such as for example a layer comprising a pure salt electrolyte, e.g. a single lithium salt such as LiI or $LiClO_4$; a polymer electrolyte, e.g. a polyethylene oxide (PEO) based Li-ion electrolyte such as $LiClO_4$ mixed in polyethylene glycol (PEG); or an ionic liquid electrolyte such as Li-TFSI salt in a BMP-TFSI ionic liquid. At the interface between the particles 11 and the electrolyte layer 12 an interface region 13 is formed wherein, for suitable material combinations, an enhanced ionic conductivity may be obtained as compared to the ionic conductivity within the bulk electrolyte layer 12. The dashed line 1 shown in FIG. 1 schematically indicates a path that may be followed by an ion through the composite material 10, from one side to an opposite side. This illustrates that in such a material the ionic conduction not only proceeds through the interface region 13, but in between neighbouring particles 11 the ionic conduction proceeds through the bulk electrolyte layer 12 having a lower ionic conductivity, thus limiting enhancement in ionic conductivity through the particle-based composite material. For composite electrolyte materials comprising a pure, solid salt electrolyte, most of which solid salts have a very low bulk ionic conductivity (e.g. $10^{-10}$ S/cm for $LiClO_4$ and $10^{-6}$ S/cm for LiI), slight enhancements of the ionic conductivity up to around $10^{-5}$ S/cm has been observed. Also for composite electrolyte materials with PEO electrolytes, which have a bulk Li-ion conductivity around $10^{-7}$ S/cm, enhancement up to $10^{-4}$ S/cm has been observed with the addition of e.g. $TiO_2$ nanoparticles in the polymer electrolyte. However, in known particle based composite electrolyte materials comprising an ionic liquid electrolyte, it is observed that the ionic conductivity is always lower than the bulk ionic conductivity of the ionic liquid electrolyte. This is also the case in particle based composite electrolyte materials comprising for example nanoporous or mesoporous particles 11 (not illustrated).

Solid composite electrolyte materials comprising an electrically insulating silica matrix (i.e. a continuous layer instead of particles, or in other words: nonparticulate) having a plurality of (nano)pores, wherein the (nano)pores are filled with a liquid electrolyte such as an ionic liquid electrolyte (e.g. Li-salt with an ionic liquid solvent) or propylene carbonate electrolyte (e.g. Li-salt with a propylene carbonate solvent), are also known. Also for this type of solid composite electrolyte materials it is observed that the ionic conductivity is lower than the bulk ionic conductivity of the solid ionic conductor (e.g. ionic liquid electrolyte), unless additional surface functionalization is provided Enhancement of the ionic conductivity due to enhanced interface conduction is not observed in these systems without additional surface functionalization. The nano-confinement of the electrolyte in the plurality of (nano)pores by itself cannot provide enhanced conductivity. On the contrary, the shear flow at the pore walls results in an enhanced viscosity of the liquid electrolyte, which decreases the conductivity in addition to the reduced volume of the bulk electrolyte.

Figure 2:
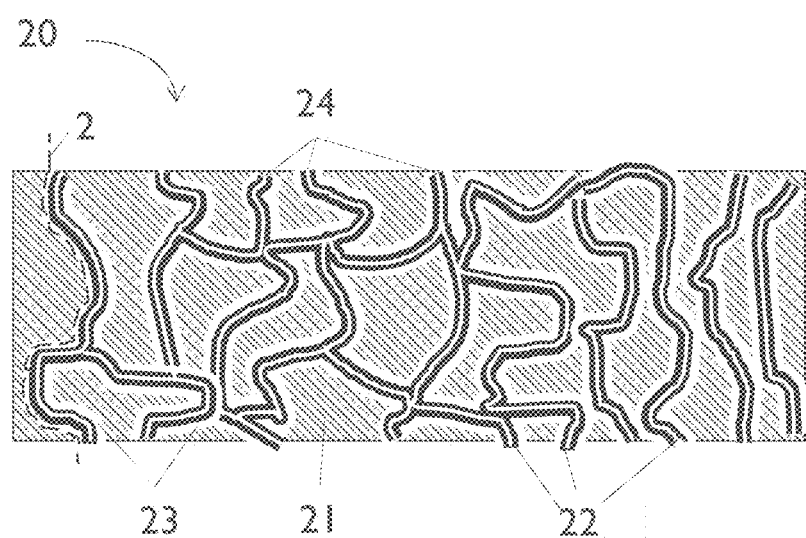
FIG. 2 schematically illustrates an example of a structure of a composite electrolyte material in accordance with an embodiment of the first aspect of the present disclosure.

Solid nanocomposite electrolyte materials according to embodiments of the present disclosure comprise a mesoporous dielectric material (typically nonparticulate) comprising a plurality of interconnected pores and a substantially continuous, uninterrupted solid electrolyte layer (throughout the solid nanocomposite electrolyte material) covering inner surfaces of the mesoporous dielectric material. The solid electrolyte layer can for example be formed by adsorption on the inner surfaces (defined by the plurality of interconnected pores) of an electrolyte such as an ionic liquid electrolyte. This is schematically illustrated in FIG. 2, showing an example of structure of such a solid nanocomposite electrolyte material 20. The nanocomposite electrolyte material 20 comprises a mesoporous dielectric material 21 comprising a plurality of interconnected pores 24 defining inner surfaces in the mesoporous dielectric material 21. The inner surfaces are covered by a continuous, uninterrupted electrolyte layer 22 (black in FIG. 2) throughout the solid nanocomposite electrolyte material 20. At an interface between the mesoporous dielectric material 21 and the electrolyte layer 22 an interface region 23 (white in FIG. 2) is formed wherein, for suitable material combinations, an enhanced ionic conductivity may be obtained as compared to the bulk ionic conductivity within the electrolyte layer 22. The suitability of material combinations for obtaining such enhanced ionic conductivity may be determined experimentally. In the further description hereinbelow, examples of such suitable material combinations are given. The dashed line 2 shown in FIG. 2 schematically indicates a path that may be followed by an ion through the nanocomposite electrolyte material 20, from one side to an opposite side. This illustrates that in such a material 20 the ionic conduction may proceed through the interface region 23 only, because—similar to the electrolyte layer 22—the interface region 23 also forms a continuous, uninterrupted (e.g. not 'interrupted' by a bulk electrolyte layer 22, as is the case in a particle-based material) path from one side to the opposite side, i.e. throughout the material 20. The interface region 23 being a region with enhanced ionic conductivity, this may result in an enhanced ionic conductivity through the nanocomposite electrolyte layer 20 as compared to the bulk ionic conductivity through a bulk electrolyte layer 22.

Therefore, when using a nanocomposite electrolyte material 20 in accordance with an embodiment of the present disclosure in an electrolyte layer of a solid-state ion insertion battery, wherein the nanocomposite electrolyte material 20 comprises a substantially continuous, uninterrupted electrolyte layer 22 and likewise a substantially continuous interface region 23 as schematically illustrated in FIG. 2, this results in the formation of an uninterrupted path with enhanced ionic conduction extending between the positive electrode and the negative electrode. This may result in an ionic conductivity of the nanocomposite electrolyte material that is higher than the bulk conductivity of the corresponding electrolyte material used for electrolyte layer. When used as an electrolyte layer in a solid-state ion insertion battery cell or battery, the higher ionic conductivity may lead to faster charging rates of the battery cell or battery. When used as an electrolyte layer in a composite electrode of a solid-state ion insertion battery cell or battery, the higher ionic conductivity may allow increasing an electrode thickness, resulting in an enhanced capacity, an enhanced energy density and an enhanced power density of the battery cell or battery.

In preferred embodiments of a nanocomposite electrolyte material in accordance with the first aspect of the present disclosure the plurality of interconnected pores of the mesoporous dielectric material have a pore size or pore diameter in the range between 2 nm and 50 nm (mesopores). Optionally the mesoporous dielectric material may additionally comprise smaller micropores, e.g. pores having a pore size smaller than 2 nm. The mesoporous dielectric material may for example have a porosity in the range between 25% and 90%, the present disclosure not being limited thereto. In a nanocomposite electrolyte material 20 according to embodiments of the present disclosure ionic conduction occurs mainly via the interface region 23 between the continuous solid electrolyte layer 22 and the mesoporous dielectric material 21. Therefore, an internal surface area (corresponding to the total area of inner surfaces of the mesoporous dielectric material) that is as large as possible is preferred. Mesoporous dielectric materials such as mesoporous silica and mesoporous alumina give the highest surface area (i.e. higher than macroporous materials having larger pores, larger than 50 nm).

In embodiments of the present disclosure the electrolyte layer 22 covering the inner surfaces of the mesoporous dielectric material 21 comprises at least two layers, i.e. at least a first layer adsorbed on the inner surfaces and a second layer covering the first layer. The first layer comprises a first dipolar compound or a first ionic compound such as for example an organic salt, an organic complex, a eutectic salt or a liquid metal salt, for example an ionic liquid. The second layer comprises a second ionic compound or a salt comprising first ions of a first polarity, such as for example large depolarized anions, and second ions of a second polarity, such as for example metal cations. The electrolyte layer 22 may further comprise at least one additional layer covering the second layer. The at least one additional layer may assist in providing an enhanced conduction of the second ions of the second polarity.

In embodiments of the present disclosure the first layer of the electrolyte layer 22 comprises a first dipolar compound or a first ionic compound, the first dipolar or ionic compound comprising a first pole of a first polarity and a second pole of a second polarity opposite to the first polarity, wherein preferably the first pole and the second pole are both capable of some form of charge delocalization over the molecular structure. This charge delocalization may for example be provided in the form of elements such as sulphur (S), phosphorous (P), nitrogen (N) and/or oxygen (O) connected to the molecular structure in a sigma-type bond ($\sigma$-bond) where free electron pairs are available or in a pi-type bond ($\pi$-bond) with carbon (C) or in combination with oxygen (O) as for example the S=O bonds in a TFSI molecule. Alternatively, the charge delocalization may for example be provided by conjugated 7E-7E bonds as for example in phenyl-type, imidazolium-type or pyridinium-type molecular structures as in several organic cations of ionic liquids. The first layer is adsorbed on the inner surfaces with the first pole facing the inner surfaces, and thereby introduces or modifies a charge delocalization in the first dipolar or ionic compound and thus introduces or modifies a molecular dipole moment over the first dipolar or ionic compound. The first dipolar compound or first ionic compound is preferably a large compound. For example, the first dipolar compound or first ionic compound may comprise an anion having a size of at least $(7 \text{ nm})^3$ and a larger cation, such as a cation having a size that is at least twice the anion size, the present disclosure not being limited thereto. In embodiments of the present disclosure the first dipolar compound or first ionic compound may for example be an organic salt, an organic complex, a eutectic salt or a metal salt. The first compound may for example be an ionic liquid.

In embodiments of the present disclosure the second layer of the electrolyte layer 22 substantially covers the first layer. The second layer comprises a second ionic compound or a salt comprising first ions of the first polarity and second ions of the second polarity. The first ions are preferably larger than the second ions, the present disclosure not being limited thereto. The first ions of the first polarity are preferably capable of some form of charge delocalization and the second ions of the second polarity may for example have limited or no charge polarization, the present disclosure not being limited thereto. In embodiments of the present disclosure the second ion of the second polarity may for example be a simple cation comprising a single element, such as for example $Li^+$, $Na^+$, $K^+$ or $Mg^{2+}$ or a simple anion comprising a single element, such as for example $Cl^-$ or $F^-$. In other embodiments of the present disclosure the second ion of the second polarity may for example contain more than one element, such as for example $NO^{3-}$ or $COO^-$. The first ions of the ionic compound or salt of the second layer are bound to the first layer, e.g. through weak intermolecular forces, the bonding to the first layer resulting in weakening of the bond between the first ions and the second ions of the second layer, thereby enhancing the mobility of the second ions. This mobility enhancement of the second ions is related to the second ions becoming less bonded or associated to the first ions. In embodiments of the present disclosure, the first layer may function as an ionic conduction promotor for the second ions of the second polarity of the second layer. The second ions of the second polarity of the second layer provide electrolyte conduction of the solid nanocomposite electrolyte material.

FIG. 3 is a schematic representation of a layer of dielectric material 21 covered with an electrolyte layer 22 comprising a stack of a first layer 221, the first layer 221 comprising a first dipolar compound or first ionic compound comprising a first pole 311 of a first polarity and a second pole 312 of a second polarity, and a second layer 222 comprising a second ionic compound or salt comprising first ions 321 of the first polarity and second ions 322 of the second polarity, illustrating charge delocalization in an embodiment wherein the first polarity is a negative polarity and the second polarity is a positive polarity. The second ions 322 (cations in the embodiment shown in FIG. 3) provide ionic conduction, in the example shown cationic conduction, such as for example in case of a Li-ion electrolyte. The bonding of the second layer 222 to the polarized first layer 221 results in weakening of the bond between the first ions 321 and the second ions 322 of the second layer 222, thereby enhancing the mobility of the second ions 322. The first layer 221 may thus function as an ionic conduction promotor for the second ions 322 of the second polarity of the second layer 222. The second ions 322 of the second polarity of the second layer provide electrolyte conduction of the solid nanocomposite electrolyte material.

FIG. 4 is a schematic representation of a layer of dielectric material 21 covered with an electrolyte layer 22 comprising a stack of a first layer 221, the first layer 221 comprising a first dipolar compound or first ionic compound comprising a first pole 311 of a first polarity and a second pole 312 of a second polarity, and a second layer 222 comprising a second ionic compound or salt comprising first ions 321 of the first polarity and second ions 322 of the second polarity, illustrating charge delocalization in an embodiment wherein the first polarity is a positive polarity and the second polarity is a negative polarity. The second ions 322 (anions in the embodiment shown in FIG. 4) provide ionic conduction, in the example shown anionic conduction, such as for example in case of a chloride electrolyte. The bonding of the second layer 222 to the polarized first layer 221 results in weakening of the bond between the first ions 321 and the second ions 322 of the second layer 222, thereby enhancing the mobility of the second ions 322. The first layer 221 may thus function as an ionic conduction promotor for the second ions 322 of the second polarity of the second layer 222. The second ions 322 of the second polarity of the second layer provide electrolyte conduction of the solid nanocomposite electrolyte material.

Figure 5:
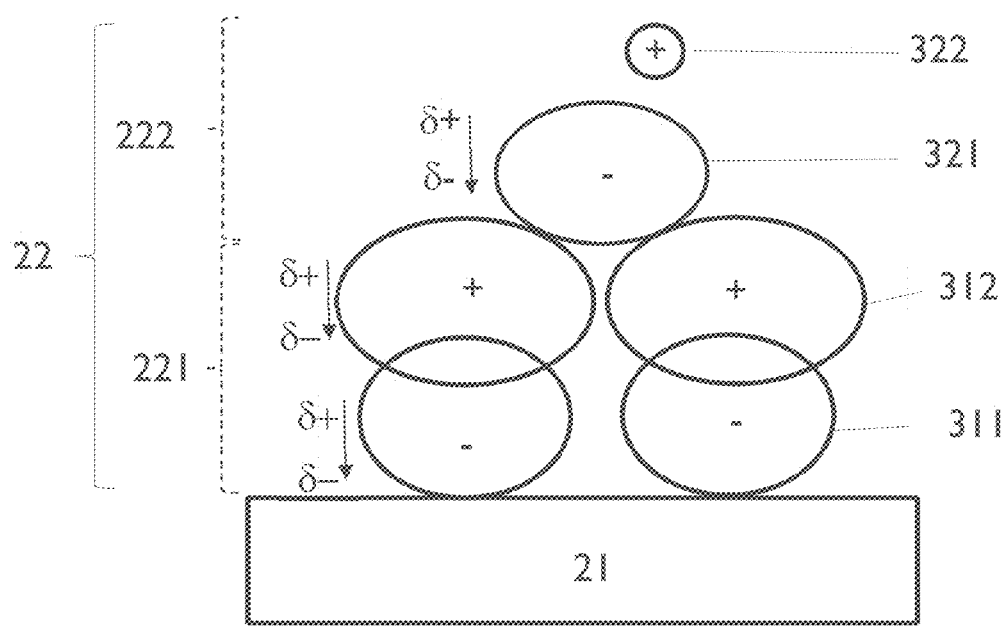
FIG. 5 is a schematic representation of a dielectric layer covered with an electrolyte layer comprising a stack of a first layer and a second layer, illustrating charge delocalization in an embodiment with a cationic conductor wherein a molar ratio between the second ionic compound or salt of the second layer and the first dipolar compound or first ionic compound of the first layer is 1:2.

FIG. 5 is a schematic representation of a layer of dielectric material 21 covered with an electrolyte layer 22 comprising a stack of a first layer 221, the first layer 221 comprising a first dipolar compound or first ionic compound comprising a first pole 311 of a first polarity and a second pole 312 of a second polarity, and a second layer 222 comprising a second ionic compound or salt comprising first ions 321 of the first polarity and second ions 322 of the second polarity, illustrating charge delocalization in an embodiment wherein the first polarity is a negative polarity and the second polarity is a positive polarity, for an example wherein a molar ratio between the second ionic compound or salt of the second layer and the first dipolar compound or first ionic compound of the first layer is different from 1, more in particular 1:2 in the example shown. This is only an example, and other molar ratios may be used, such as for example 1:3 to 1:5, the present disclosure not being limited thereto. It is an advantage of a molar ratio smaller than 1 that it may result in an enhanced mobility of the second ions 322 of the second polarity of the second layer 222 and thus an enhanced ionic conductivity. However, the smaller this molar ratio is, the smaller the amount of available second ions and the larger a distance between these second ions, which may result in a reduced ionic conductivity. Therefore, there may exist an optimum for the molar ratio between the second ionic compound or salt of the second layer and the first dipolar compound or first ionic compound of the first layer. Such optimum ratio may be determined experimentally.

In embodiments of the present disclosure wherein the electrolyte layer 22 comprises at least one additional layer covering the second layer, the at least one additional layer is preferably suitable for or adapted for solvation and conduction of the second ions of the second polarity of the second ionic compound or salt of the second layer. In other words, the at least one additional layer is preferably a solvent and a conductor for the second ions of the second polarity of the second ionic compound or salt of the second layer. Such at least one additional layer may function as a kind of 'solvent' layer for the second ions of the second polarity of the second ionic compound or salt of the second layer, i.e. it may further facilitate (enhance) movement of these second ions through the nanocomposite electrolyte material, thus enhancing the ionic conductivity through the nanocomposite electrolyte material. The at least one additional layer may for example comprise the same ionic compound or the same salt as the second layer, the present disclosure not being limited thereto.

Figure 6:
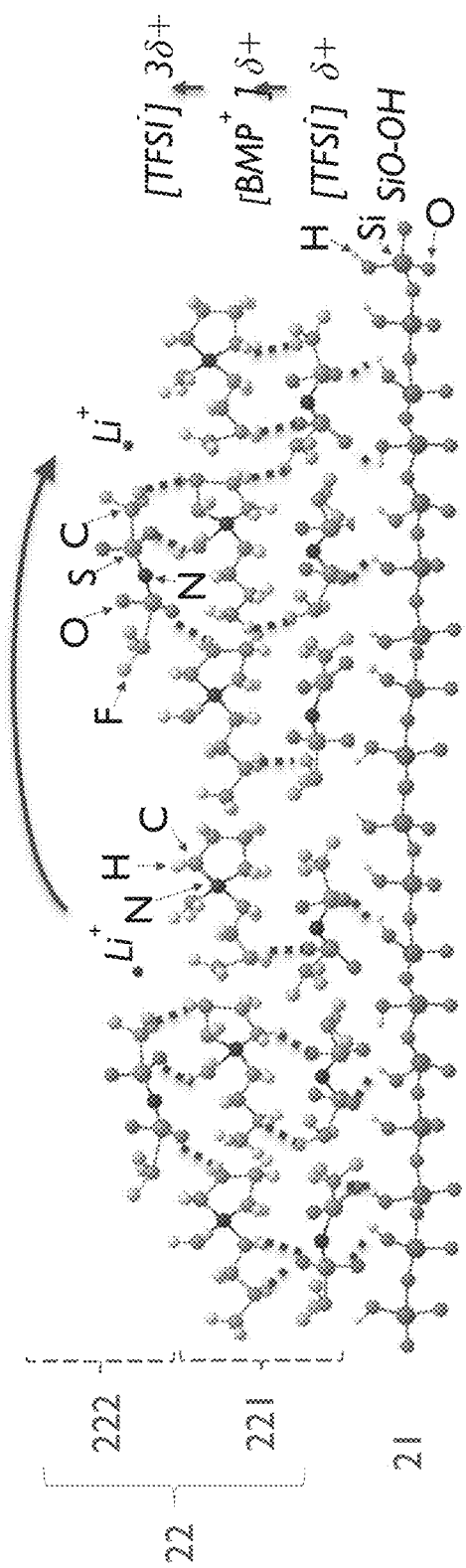
FIG. 6 is a schematic representation of an example of a silica layer surface covered with an electrolyte layer comprising a stack of a first layer and a second layer.

FIG. 6 is a schematic representation of an example of a silica layer 21 surface covered with an electrolyte layer 22 comprising a stack of a first layer 221 and a second layer 222, as may be used in an embodiment of the present disclosure. In the example shown in FIG. 6, the silicon oxide (silica) layer 21 has an OH-terminated surface, the first layer 221 comprises an ionic liquid (first ionic compound), more in particular a [BMP]TFSI (1-Butyl-1-methyl pyrrolidinium [BMP+] bis(trifluoromethylsulfonyl)imide [TFSI$^-$]) ionic liquid, and the second layer 222 comprises a TFSI$^-$ (bis (trifluoromethylsulfonyl)imide) anion (first ion of negative polarity) and a Li$^+$ cation (second ion of positive polarity). The first layer 221 is adsorbed on the silica layer surface, with the first pole of negative polarity ([TFSI$^-$]) facing the surface. The second layer 222 covers the first layer 221 and is bound by its first ions of negative polarity to the first layer.

Figure 7:
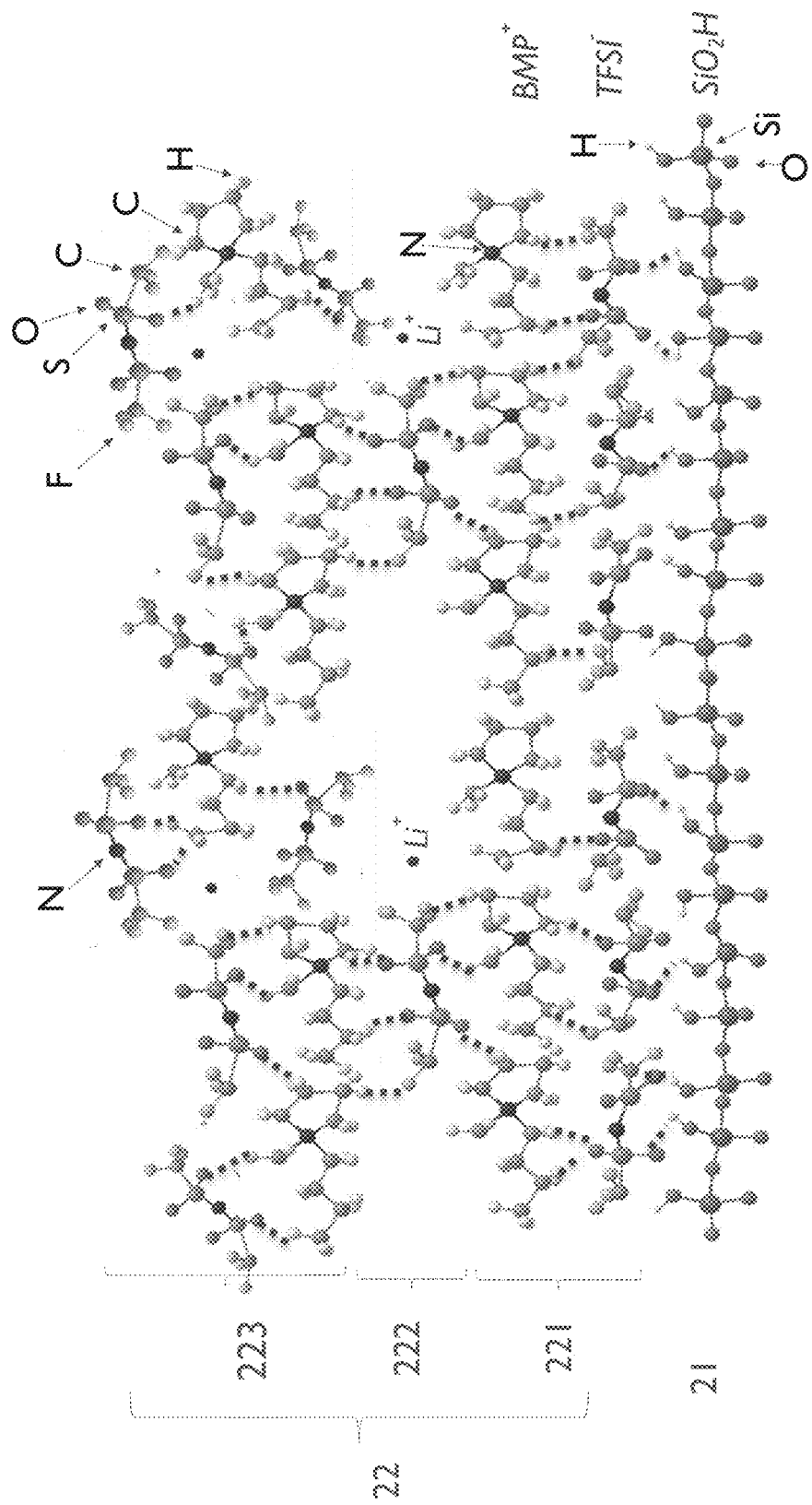
FIG. 7 is a schematic representation of an example of a silica layer surface covered with an electrolyte layer comprising a stack of a first layer, a second layer and an additional layer.

FIG. 7 is a schematic representation of an example of a silica layer 21 surface covered with an electrolyte layer 22 comprising a stack of a first layer 221, a second layer 222 and an additional layer 223, as may be used in an embodiment of the present disclosure.

The present disclosure is not limited to the examples shown in FIG. 6 and FIG. 7. Other first dipolar compounds or first ionic compounds may be used for forming the first layer and/or other first ions and second ions may be included in the second layer. For example, the first dipolar compound or first ionic compound may be an organic salt, an organic complex, a eutectic salt or a metal salt. For example, the first dipolar compound or first ionic compound may be an ionic liquid such as for example [BMP$^+$][TFSI$^-$] (1-Butyl-1-methyl pyrrolidinium bis(trifluoromethyl sulfonyl)imide), [BMI$^+$][TFSI$^-$](1-buthyl-3-methyl imidazolium bis(trifluoromethyl sulfonyl)imide), an organic salt such as 1-buthyl-3-methyl-imidazolium chloride ($T_m$ 342K), 1-ethyl-3-methyl-imidazolium nitrate ($T_m$ 311K) or 1-methyl-3-methyl-imidaxolium tetrafluoroborate ($T_m$ 377K) or an inorganic salt such as a chloroaluminate or LiF—BeF$_2$, the present disclosure not being limited thereto. Examples of a first ion that may be part of the second layer are ClO$_4^-$, BF$_4^-$, PF$_6^-$, TFSI$^-$ and BETI$^-$ (bis(perfluoroethyl sulfonyl) imide), the present disclosure not being limited thereto. In embodiments of the present disclosure the second ion of the second layer may for example be a metal cation, such as for example Li$^+$, Na$^+$, K$^+$, Ca$^{2+}$, Mg$^{2+}$, Cu$^{2+}$, Al$^{3+}$, Co$^{2+}$ or Ni$^{2+}$, the present disclosure not being limited thereto.

Figure 8:
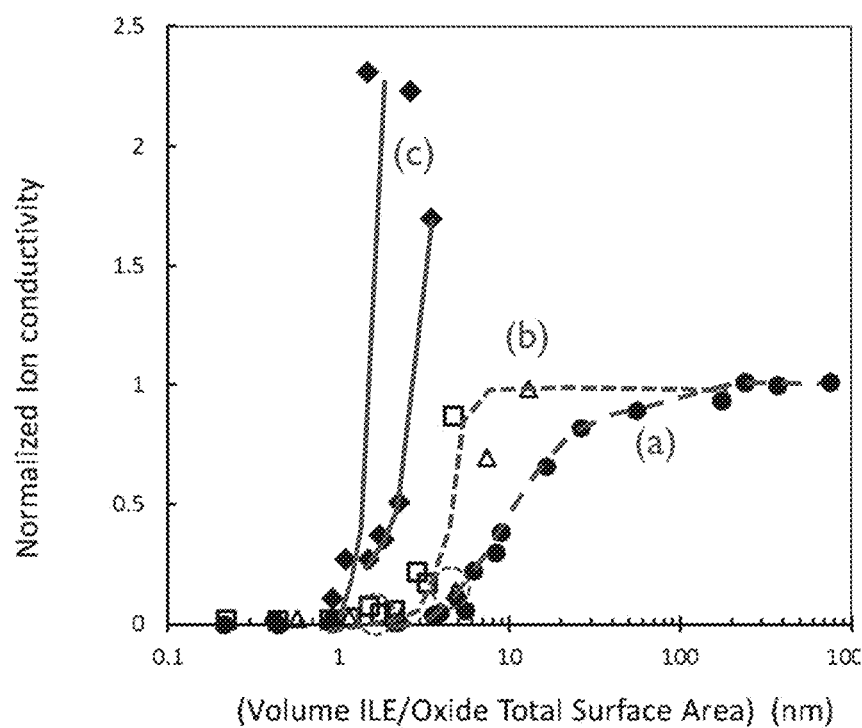
FIG. 8 shows the normalized ionic conductivity as measured for different solid nanocomposite electrolyte materials, as a function of the ionic liquid electrolyte volume per total oxide surface area, for three types of materials: (a) nanoparticle-based composite electrolytes; (b) mesoporous microparticle-based composite electrolytes; and (c) nanocomposite electrolytes comprising a mesoporous dielectric material in accordance with embodiments of the present disclosure.

FIG. 8 shows the normalized ionic conductivity as measured for different solid nanocomposite electrolyte materials comprising an oxide material with an ionic liquid electrolyte being provided on inner surfaces of the oxide material. The plot shows the ionic conductivity normalized to the bulk ionic conductivity of the corresponding ionic liquid electrolyte, as a function of the ionic liquid electrolyte volume per total oxide surface area (i.e. the total area of the inner surfaces of the oxide material on which the ionic liquid electrolyte may be provided, e.g. coated), for three types of materials. Curve (a) (filled circles) shows normalized ionic conductivities measured for nanoparticle-based composite electrolytes comprising non-porous or substantially non-porous nanoparticles. Results are shown for composite electrolytes comprising either silicon oxide nanoparticles or aluminum oxide nanoparticles, for different nanoparticle sizes (7 nm to 80 nm). In such nanoparticle-based composite electrolytes ionic conduction proceeds partially through the bulk of the electrolyte layer (as illustrated in FIG. 1), such that the effect of enhanced ionic conduction at the interface between the oxide and the electrolyte layer on the total ionic conductivity is negligible. Curve (b) (open squares and open triangles) shows normalized ionic conductivities measured for mesoporous microparticle-based composite electrolytes comprising mesoporous microparticles. Open squares show results for composite electrolytes comprising mesoporous aluminum oxide particles having a pore size of 4 nm; open triangles show results for composite electrolytes comprising MOF (Metal-Organic Framework) particles having a pore size of 3 nm. Although in such mesoporous microparticle-based composite electrolyte materials the total inner surface area may be larger than in materials based on non-porous particles, also in this type of materials the ionic conduction proceeds partially through the bulk of the electrolyte layer (similar to what is illustrated in FIG. 1), leading to a negligible influence of the enhanced ionic conduction at the interface between the oxide and the electrolyte layer on the total ionic conductivity. Curve (c) (filled diamonds) shows normalized ionic conductivities measured for solid nanocomposite electrolyte materials comprising a mesoporous dielectric material comprising a plurality of interconnected pores (a continuous, substantially uninterrupted mesoporous matrix) in accordance with embodiments of the present disclosure, as for example illustrated in FIG. 2. Results are shown for composite electrolytes comprising a BMP-TFSI ionic liquid and for composite electrolytes comprising a BMI-TFSI ionic liquid.

The ionic liquid electrolyte volume per total oxide surface area corresponds to the theoretical coating thickness of the electrolyte layer on the inner surfaces of the dielectric material, assuming that the entire ionic liquid volume would be coated on and equally distributed over the available inner surface area. The data shown in FIG. 8 illustrate that theoretically an ionic liquid electrolyte coating having a thickness of about 10 nm coating would be needed to reach half of the ionic liquid electrolyte bulk conductivity for substantially non-porous nanoparticles (a), and a thickness of about 5 nm for mesoporous microparticles (b). For solid nanocomposite electrolyte materials comprising a continuous mesoporous dielectric material in accordance with embodiments of the present disclosure an ionic liquid electrolyte coating having a thickness of less than 2 nm would be sufficient. Further, the results shown in FIG. 8 illustrate that for both composite particle-based materials (a) and (b), the ionic conductivity does not exceed the bulk ionic conductivity. For the mesoporous continuous matrix based materials (c), however, the bulk conductivity may be exceeded (depending on the relative ionic liquid electrolyte volume). This illustrates that interface enhancement of the ionic conductivity is indeed present and that it does have a positive effect on the total ionic conductivity of solid nanocomposite electrolyte materials according to embodiments of the present disclosure.

As opposed to particle-based materials (a) and (b), in materials in accordance with embodiments of the present disclosure (c) an enhanced total ionic conductivity may be obtained, if the electrolyte layer forms a continuous, substantially uninterrupted coating on the inner surfaces of the mesoporous dielectric material. Any interruption in the electrolyte coating may result in an interrupted ionic conduction path and thus a reduction of the number of connecting pores and thus a reduction of the total ionic conductivity. Empty pores do not contribute to the ionic conduction. Therefore, preferably a substantial part of the inner surfaces, preferably all inner surfaces, is coated or covered with an electrolyte layer. In preferred embodiments the electrolyte coating comprises a few monolayers, for example at least two to three monolayers, the present disclosure not being limited thereto. In some embodiments the pores may be completely filled with an electrolyte, e.g. depending on the pore size and on the electrolyte monolayer thickness.

A further requirement is that the interaction between the dielectric matrix (e.g. silica) and the electrolyte layer coated on its inner surfaces provides an ionic conduction enhancement. This is not the case for any combination of dielectric and electrolyte materials. For example, it was experimentally shown (Xubin Chen et al, "100 nm Thin-Film Solid-Composite Electrolyte for Lithium-Ion Batteries", Adv. Mater. Interfaces 2017, 1600877) that a hydrophobic pore surface such as a methyl ($CH_3-$) terminated pore surface in CVD silica does not provide an ionic conduction enhancement for mixtures of $LiClO_4$ and PEG (polyethylene glycol). The Li-ion conductivity was shown to be lower than for a pure $LiClO_4$-PEG polymer electrolyte, due to an increase in viscosity—which is inversely proportional to the conductivity—of the electrolyte in the porous silica structure. Suitable combinations of dielectric materials and electrolyte layers providing an ionic conduction enhancement may be determined experimentally.

In a second aspect, the present disclosure provides a solid nanocomposite electrolyte layer comprising a solid nanocomposite electrolyte material in accordance with an embodiment of the first aspect of the present disclosure. The solid nanocomposite electrolyte layer may be provided on a substrate. The substrate may for example comprise a semiconductor material (such as e.g. silicon), a metal (such as e.g. a metal foil), a carbon nanosheet, a plastic foil or a ceramic material such as a silicate, the present disclosure not being limited thereto. The substrate may comprise or consist of a stack of different layers. For example, when a solid nanocomposite electrolyte layer according to the second aspect of the present disclosure is used as a solid electrolyte layer of an ion-insertion battery, the substrate may comprise a carrier substrate, such as a silicon carrier substrate, with a collector layer and an electrode layer provided thereon.

In advantageous embodiments of the second aspect of the present disclosure the solid nanocomposite electrolyte layer comprises a plurality of interconnected pores extending without interruption from a first surface side of the layer (e.g. the surface facing the substrate) to a second surface side opposite to the first side (the second surface side e.g. being the layer surface facing away from the substrate), with a continuous, substantially uninterrupted electrolyte layer covering the inner surfaces of the layer, wherein the electrolyte layer extends without interruption from the first surface side to the second surface side of the nanocomposite electrolyte layer. It is an advantage that this results in the formation of a continuous path for enhanced ionic conduction between opposite surfaces of the nanocomposite electrolyte layer. This may result in an ionic conductivity through the nanocomposite electrolyte layer (e.g. between a first electrode layer and a second electrode layer of a battery cell or of a battery) that is higher than the bulk ionic conductivity of a bulk electrolyte layer only consisting of the electrolyte layer.

In a third aspect, the present disclosure provides a composite ion insertion electrode comprising a mixture of an active electrode material and a solid nanocomposite electrolyte material in accordance with an embodiment of the first aspect of the present disclosure. The composite ion insertion electrode may be a thin film electrode, for example for use as an electrode layer in a thin film solid-state ion insertion battery. In other embodiments the composite ion insertion electrode may be a particle-based or pellet based electrode, for example for use as an electrode layer in a particle-based ('ceramic') solid-state ion insertion battery cell or battery.

In a fourth aspect, the present disclosure provides a solid-state battery cell and a solid-state battery comprising a solid nanocomposite electrolyte layer in accordance with an embodiment of the second aspect of the present disclosure. The solid-state battery may be a thin film battery or a ceramic battery.

In a fifth aspect, the present disclosure provides a solid-state battery cell and a solid-state battery comprising a composite ion insertion electrode in accordance with an embodiment of the third aspect of the present disclosure. The solid-state battery may be a thin film battery or a ceramic battery.

In a sixth aspect, the present disclosure provides a method for forming a solid nanocomposite electrolyte material in accordance with an embodiment of the first aspect of the present disclosure. A method for forming a solid nanocomposite electrolyte material according to the sixth aspect of the present disclosure comprises: obtaining (providing, forming) a solution comprising a dielectric material precursor, a first dipolar compound or a first ionic compound, a second ionic compound or a salt, deionized water and a solvent (preferably an alcohol); converting the solution into a solid material by inducing gelification of the solution, thereby forming a gel; and afterwards drying the gel to form the solid nanocomposite electrolyte material.

In advantageous embodiments of a method in accordance with the sixth aspect of the present disclosure the dielectric material precursor may be a silica precursor or an alumina precursor or a mixture thereof, the first dipolar compound or first ionic compound may be an organic salt, an organic complex, a eutectic salt or a metal salt, for example an ionic liquid, and the second ionic compound or salt may comprise a metal salt, the metal salt comprising a metal cation selected for example from $Li^+$, $Na^+$, $K^+$, $Ca^{2+}$, $Mg^{2+}$, $Cu^{2+}$, $Al^{3+}$, $Co^{2+}$ and $Ni^{2+}$ and a large depolarized anion for example selected from $ClO_4^-$, $BF_4^-$, $PF_6^-$, $TFSI^-$ and $BETI^-$, the present disclosure not being limited thereto.

It is an advantage of a method according to embodiments of the sixth aspect of the present disclosure that it only requires a single fabrication step, more in particular a single sol-gel based fabrication step to simultaneously form the mesoporous dielectric material and the electrolyte layer covering inner surfaces thereof. In other words, there is no need for first forming a mesoporous dielectric material comprising a plurality of interconnected pores and afterward coating the inner surfaces of the mesoporous dielectric material with an electrolyte layer. Instead, those steps can be combined in a single sol-gel fabrication procedure. Forming the mesoporous dielectric material having a plurality of interconnected pores and coating its inner surfaces with an electrolyte layer can be done simultaneously, i.e. combined in a single fabrication procedure.

It is an additional advantage of using a sol-gel nanocomposite electrolyte fabrication process that it allows impregnating battery cell electrodes, e.g. particle-based or pellet based electrodes, with the nanocomposite electrolyte, thereby forming composite electrodes comprising a mixture of an active electrode material and a solid nanocomposite electrolyte. It allows forming compact composite electrode structures, because the gelification and drying processes used in the sol-gel method typically imply a shrinkage. Hence, using such a method, very dense electrodes can be made with a high volume percentage of active electrode material, resulting in electrodes with high energy density.

Using a method according to an embodiment of the sixth aspect of the present disclosure, a continuous, uninterrupted surface electrolyte layer or coating covering (without interruption) the inner surfaces of the dielectric material may be formed when the relative amount (relative to the amount of dielectric material precursor) of the electrolyte material, comprising the first dipolar compound or first ionic compound and the second ionic compound or salt, in the solution exceeds a certain threshold value $x_{thr}$ for x (wherein x refers to the molar ratio between at one hand the sum of the molar amount of the first ionic compound or first dipolar compound and the second ionic compound or salt, and at the other hand the molar amount of dielectric material precursor). This threshold value $x_{thr}$ depends on the type of first dipolar compound or first ionic compound used and on the type and concentration of the second ionic compound or salt (e.g. Li-salt). For further increasing values of x above the threshold value $x_{thr}$, the formation of a continuous, uninterrupted surface electrolyte layer covering the inner surfaces without interruption may still be realized, but when x exceeds a certain critical value $x_{crit}$, the ionic liquid electrolyte content may be too high to form such an uninterrupted layer. At x values above $x_{crit}$ the formation of a mesoporous dielectric material may be impeded and instead a dielectric material having larger pores with smaller surface area (resulting in a smaller ionic conductivity) may be formed or discontinuous dielectric particles may be formed inside an ionic liquid electrolyte. For a selected material combination, the values of $x_{thr}$ and $x_{crit}$ may be determined experimentally.

The electrolyte material added to the silica sol-gel mixture can be liquid or solid in its bulk form. It may comprise a mixture of a second ionic compound or salt such as a metal salt, e.g. lithium salt, with a solvating medium or molecule (first dipolar compound or first ionic compound) such as an organic salt (e.g. an ionic liquid) or polymer (polyethylene glycol or PEG or derivatives thereof) which are the solvation media in, respectively, ionic liquid electrolytes (ILE) and polymer electrolytes (polyethylene oxide or PEO electrolytes). In preferred embodiments the solvating medium has the ability to form coordinating bonds to stabilize the metal cations, e.g. Li+ ions, but with very weak association so that the metal cations, e.g. Li+ ions can easily move from one coordination site to another.

A solid nanocomposite electrolyte material according to embodiments of the present disclosure may be formed by means of a 'single-step' sol-gel process. For example, a nanocomposite electrolyte material comprising a mesoporous silica material and a Li-ion based electrolyte may be formed by first providing a solution comprising a silica precursor (such as for example TEOS or PEOS, the present disclosure not being limited thereto), a solvent (such as for example 1-Methoxy-2-propanol or PGME, the present disclosure not being limited thereto), a lithium salt (such as for example LiTFSI or LiClO$_4$, the present disclosure not being limited thereto), H$_2$O and a porogen that is also functional for Li-ion solvation and/or a surface conduction promotor (such as for example [BMP][TFSI] or PEG). In such a solution, the Li salt may act as a catalyst. This means that, as opposed to most prior art solutions, there is no need for adding an acidic component to the precursor solution, which is advantageous in that this may lead to an improved compatibility with several types of substrates, e.g. electrode layers, on which a solid nanocomposite electrolyte material may be provided. An organic salt may be used as porogen and as Li-ion solvation medium. Curing may be done at low temperature, e.g. at a temperature lower than 120° C. However, this is only an example and the present disclosure is not limited thereto.

As an example, for Li-ion based materials, the solution may contain:
- a second ionic compound or salt such as for example: lithium bis(trifluoromethanesulfonyl)imide (LiTFSI) Lithium salt or another lithium salt such as lithium perchlorate, lithium tetrafluoroborate, lithium hexafluoroarsenate, lithium Hexafluorophosphate, lithium trifluoromethanesulfonate, lithium tris(perfluoroethyl)trifluorophosphate, lithium fluoroalkylborate, or lithium bisachtungtrennung(oxalato)borate, the present disclosure not being limited thereto.
- deionized H$_2$O;
- a first dipolar compound or first ionic compound, such as for example: N-Butyl,N-methyl pyrrolidinium bis(trifluoromethanesulfonyl)imide ([BMP][TFSI]) ionic liquid. The ionic liquid may have an organic or inorganic anion such as hexafluorophosphate, tetrafluoroborate, trifluoromethanesulfonate, tosylate, nitrate, mesylate, octylsulfate, or perchlorate, the present disclosure not being limited thereto; and a cation such as imidazolium, phosphonium, ammonium, pyridinium, pyrazolium, piperidinium, sulfonium, triazolium, thiazolium, pyrrolidinium, benzimidazolium wherein the H on the cation may be replaced by an organic group such as butyl, methyl or ethyl, the present disclosure not being limited thereto. In preferred embodiments anion/cation combinations are selected that are (electro)chemically stable, both under synthesis conditions and in battery operating conditions.
- a dielectric material precursor, such as for example: alky silicate precursor tetraethyl orthosilicate (TEOS) or another silicate precursor such as tetramethoxysilane, methyltrimethoxysilane, bis(triethoxysilyl)ethane, vinyltriethoxysilane, or aminopropyltrimethoxysilane, the present disclosure not being limited thereto; and
- a solvent, such as for example: 1-Methoxy-2-propanol (PGME) or another alcohol such as methanol, ethanol or isopropanol, the present disclosure not being limited thereto.

In advantageous embodiments the molar ratio between an ionic liquid (first dipolar compound or first ionic compound) and an alky silicate precursor (dielectric material precursor) may for example be in the range between 0.1 and 2; the volume ratio between H$_2$O and an alky silicate precursor may be about 1; the molar ratio of a lithium salt (second ionic compound or salt) and an ionic liquid may be in the range between 0.1 and 1; and a weight ratio between an ionic liquid and a solvent may be in the range between 0.1 and 2. The solution may be free of an acid component. However, the present disclosure is not limited thereto, and other ratios and solution compositions may be used.

As an example, the step of providing a solution for the sol-gel process may comprise providing Li-TFSI, H$_2$O, BMP-TFSI, TEOS and PGME sequentially into a glass container. Any sequence of adding the different chemicals to the solution may be used. For example, 0.22 g Li-TFSI, 0.75 ml H$_2$O, 0.97 g BMP-TFSI, 0.5 ml TEOS and 1 ml PGME may be provided. The step of providing the solution is followed by a gelification step, and afterwards a drying step is done. Gelification may for example comprise maintaining the solution at ambient temperature (or for example at a temperature in the range between 0° C. and 60° C.) for a few days, such as for example for four to six days, till a gel is formed, i.e. till the solution is converted into a gel. The drying step may for example comprise placing the gel in a vacuum oven, for example at a pressure lower than 10$^{-3}$ mbar, at a temperature in the range between 90° C. and 150° C. for about 48 hours. Before performing the drying step a pre-baking step may be performed, such as for example at 80° C. in vacuum for several hours to evaporate a majority of water molecules and organic solvents. The baking step then results in removal of the remaining water molecules and curing of the silica material, thereby solidifying the silica material. However, this is just an example and the present disclosure is not limited thereto: other solution compositions, other gelification conditions and other drying conditions may be used.

Examples of room temperature ionic liquids (i.e. ionic liquids that are liquid at room temperature) that may be used for preparing Li-ion ionic liquid electrolytes are: N-Butyl, N-methyl pyrrolidinium bis(trifluoromethanesulfonyl)imide ([BMP][TFSI]) 1-Butyl,3-methyl imidazolium bis(trifluoromethanesulfonyl)imide ([BMI][TFSI]). However, the present disclosure is not limited thereto and other ionic liquids may be used. For example, ionic liquids with melting point $T_m$ higher than room temperature (i.e. ionic liquids that are solid at room temperature) may be used, such as for example for Na-ion or Mg-ion based ionic liquid electrolytes. Some examples are: 1-butyl-3-methyl-imidazolium chloride ($T_m$ 69° C.), 1-ethyl-3-methyl-imidazolium nitrate ($T_m$ 38° C.), and 1metyl-3-methyl-imidazolium tetrafluoroborate ($T_m$ 104° C.).

Inorganic salts can also be liquid at higher temperatures (and be used to dissolve other metal salts) and are typically indicated as "molten salts". Examples are: chloroaluminates and $LiF$—$BeF_2$. There are also specific mixtures called: "eutectic salt" and "liquid metal salts", such as for example Lithium nitrate in mixture with N-methylacetamide and Lithium bis(trifluoromethanesulfonyl)imide in mixture with glyme.

All these materials can be used as an ionic electrolyte to be added in a one-step sol-gel mixture for fabrication of a nanocomposite electrolyte material according to embodiments of the present disclosure.

Examples are provided hereinbelow, which illustrate experiments in which a method according to embodiments of the sixth aspect of the present disclosure was used for forming solid nanocomposite electrolyte materials and solid nanocomposite electrolyte layers in accordance with the first and second aspects of the present disclosure. These examples are provided for illustrating features and advantages of embodiments of the present disclosure, and to aid the skilled person in reducing the disclosure to practice. However, these examples are not to be construed as limiting the disclosure in any way, Nanocomposite electrolyte materials were fabricated in accordance with an embodiment of the present disclosure. A solution containing 0.5 ml TEOS, 0.5 ml $H_2O$, 1 ml PGME, Li-TFSI lithium salt and [BMP][TFSI] ionic liquid was used as a basis for the sol-gel process in a first experiment. In a second experiment, a solution containing 0.5 ml TEOS, 0.5 ml $H_2O$, 1 ml PGME, Li-TFSI lithium salt and [BMI][TFSI] ionic liquid was used as a basis for the sol-gel process. In both cases the molar ratio between the lithium salt and the ionic liquid was 0.34, and different molar ratios x between the ionic liquid electrolyte and the TEOS precursor were used, more in particular: 0.1, 0.25, 0.5, 1.0 and 1.5. After gelification the gel was dried at 120° C.

Figure 9:
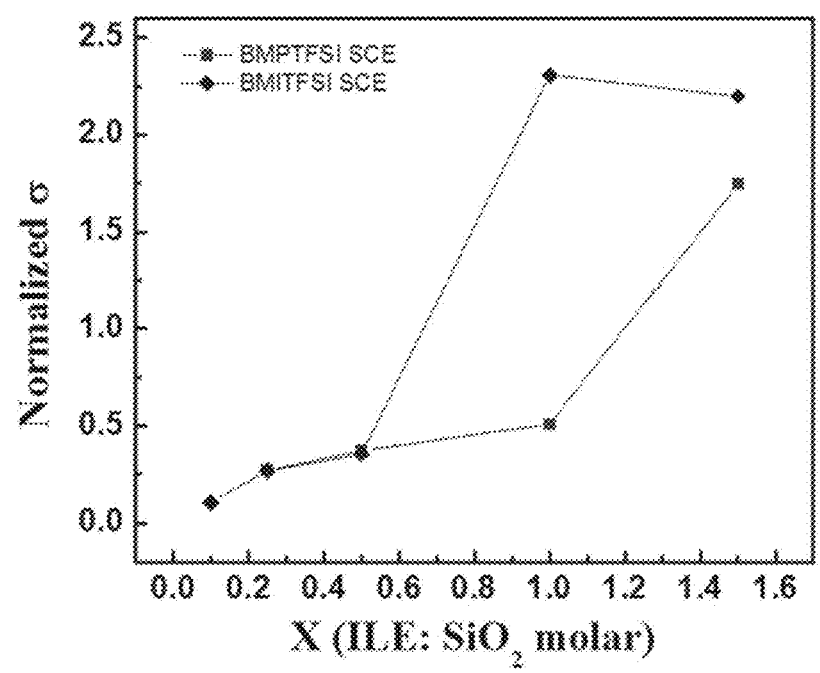
FIG. 9 shows the normalized ionic conductivity as measured for different solid nanocomposite electrolyte materials in accordance with embodiments of the present disclosure, as a function of the molar ratio x between the ionic liquid electrolyte (Li salt and ionic liquid) and the silica precursor in the solution used in a sol-gel fabrication process, for different ionic liquids.

FIG. 9 shows the normalized ionic conductivity (normalized to the bulk ionic conductivity of the corresponding ionic liquid electrolyte) as measured for the solid nanocomposite electrolyte materials thus fabricated, as a function of the molar ratio x (as defined above), for the different ionic liquids: [BMP][TFSI] (squares) and [BMI][TFSI] (diamonds) combined with Li-TFSI salts. From these experimental results, it can be concluded that, for the examples shown, there is a lower boundary to the molar ratio x ($x_{thr}$) above which an increased ionic conduction is obtained. Below this lower boundary an ionic conduction lower than the ionic conduction through the bulk electrolyte layer was measured. This may be an indication that a minimum molar ratio is required to enable complete coverage of the inner surfaces of the mesoporous silica material, i.e. to form an electrolyte layer on the inner surfaces of the mesoporous silica material that is continuous and substantially uninterrupted. In the example shown, the highest ionic conductivity enhancement is obtained for the [BMI][TFSI] based nanocomposite electrolyte material.

Figure 10:
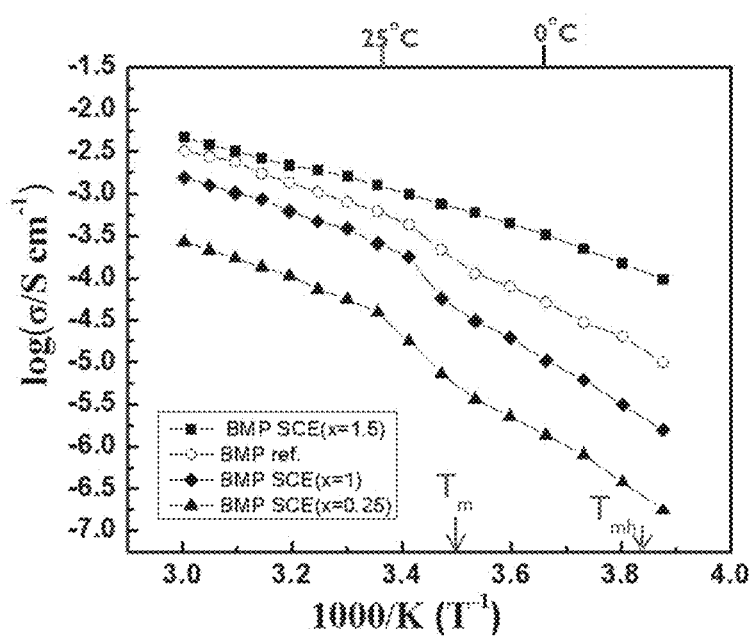
FIG. 10 shows the measured ionic conductivity values of nanocomposite electrolyte materials fabricated using a sol-gel process, for different molar ratios x of ionic liquid electrolyte to silica in the sol-gel precursor solution with Li salt added (0.34 molecules [Li$^+$][TFSI$^-$] per 1 [BMP$^+$][TFSI$^-$]) (filled symbols) and for the pristine or bulk lithium salt in ionic liquid solution (open circles), as a function of temperature.

FIG. 10 shows the measured ionic conductivity values of nanocomposite electrolyte materials fabricated using a sol-gel process, for different molar ratios x of ionic liquid electrolyte to silica precursor in the sol-gel solution with lithium salt added (0.34 molecules [$Li^+$][$TFSI^-$] per 1 [$BMP^+$][$TFSI^-$]) (filled symbols) and for the pristine or bulk lithium salt in ionic liquid (open circles), as a function of temperature. FIG. 10 shows ionic conductivity values for x=0.25 (filled triangles), for x=1 (filled diamonds) and for x=1.5 (filled squares). For the bulk ionic liquid electrolyte (open circles) different regimes can be observed in the temperature dependence of the ionic conductivity, depending on the phase of the electrolyte material: for temperatures higher than the melting temperature $T_m$ the ionic liquid electrolyte is a liquid material, for temperatures lower than the temperature of complete solidification $T_{mh}$ it is a solid material, and for temperatures between the temperature between $T_m$ and $T_{mh}$ it is in a mesophase (i.e. a phase in between fully liquid and fully solid).

Figure 11:
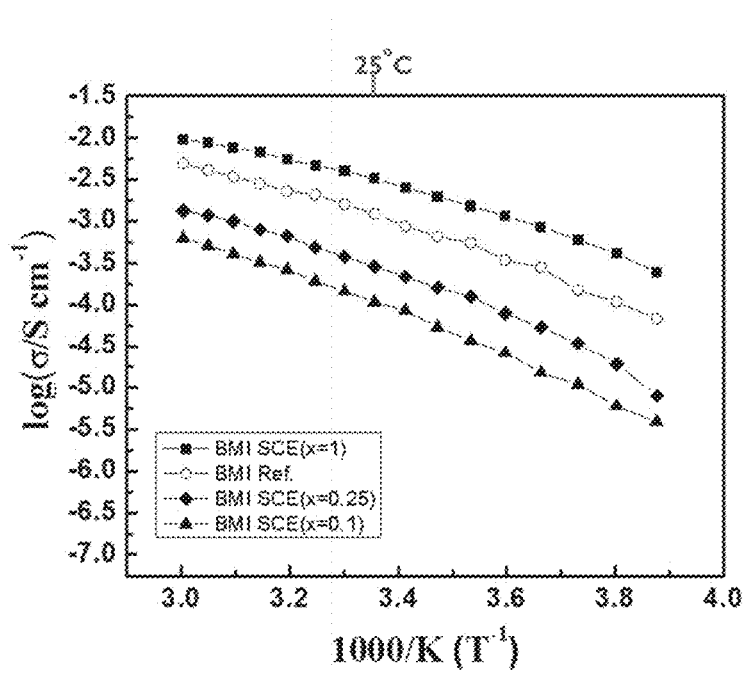
FIG. 11 shows the measured ionic conductivity values of nanocomposite electrolyte materials fabricated using a sol-gel process, for different molar ratios x of ionic liquid electrolyte to silica in the sol-gel precursor solution with Li salt added (0.34 molecules [Li$^+$][TFSI$^-$] per 1 [BMI$^-$][TFSI$^-$]) (filled symbols) and for the pristine or bulk lithium salt in ionic liquid solution (open circles), as a function of temperature.

FIG. 11 shows the measured ionic conductivity values of nanocomposite electrolyte materials fabricated using a sol-gel process, for different molar ratios x of ionic liquid electrolyte to silica precursor in the sol-gel solution with lithium salt added (0.34 molecules [$Li^+$][$TFSI^-$] per 1 [$BMI^+$][$TFSI^-$]) (filled symbols) and for the pristine or bulk lithium salt in ionic liquid (open circles), as a function of temperature. Ionic conductivity values are shown for x=0.1 (filled triangles), for x=0.25 (filled diamonds) and for x=1 (filled squares).

The reference curves representing the temperature dependence of the ionic conductivity for the bulk ionic liquid electrolytes ([$BMP^+$][$TFSI^-$] ionic liquid with [$Li^+$][$TFSI^-$] salt in FIG. 10; [$BMI^+$][$TFSI^-$] ionic liquid with [$Li^+$][$TFSI^-$] salt in FIG. 11), shows different zones, related to the phase of the ionic liquid electrolyte (ILE): a first zone above the melting point ($T_{mp}$) where the ILE is liquid; a second zone below the melting point but above the temperature of complete solidification $T_{mph}$ and a third zone below the temperature of complete solidification where the ILE is solid. In the second zone the ILE is in a mesophase, i.e. a phase between fully liquid and fully solid. This is related to the presence of several molecular bonds between the molecules of the ionic liquid mixture that solidify at different temperatures. As one bond affects the other molecular interactions, solidification happens over a temperature range instead of at one distinct temperature. In the results shown in FIG. 10 and FIG. 11 a similar temperature dependence of the ionic conductivity is observed for nanocomposite electrolyte materials comprising a mesoporous dielectric material having the electrolyte layer coated on inner surfaces, in a lower range of x-values. For this range of x-values the ionic conductivity of the nanocomposite electrolyte material is lower than the ionic conductivity of the corresponding bulk electrolyte. However, for a higher range of x-values a different temperature dependence of the ionic conductivity is observed, which is an indication for the presence of a mesophase over the entire temperature range shown. Within this range of x-values the ionic conductivity of the nanocomposite electrolyte material is higher than the ionic conductivity of the corresponding bulk electrolyte. This indicates that there is a threshold value $x_{thr}$ for x, above which an increased ionic conductivity is obtained. This threshold value $x_{thr}$ depends on the materials used. For example, for ([BMP$^+$][TFSI$^-$] (FIG. 10) $x_{thr}$ is lower than 1.5 but higher than 1; for [BMI$^+$][TFSI$^-$] (FIG. 11) $x_{thr}$ is lower than 1 but higher than 0.25). For other material combinations, the threshold value $x_{thr}$ can be determined experimentally, based on measurements of the temperature dependence of the ionic conductivity as a function of temperature for different x-values.

FIG. 10 and FIG. 11 show results for electrolyte materials wherein a molar ratio of 0.34 was used between [Li$^+$][TFSI$^-$] at one hand and [BMP$^+$][TFSI$^-$] or [BMI$^+$][TFSI$^-$] at the other hand, which corresponds to a Li-ion concentration of 1M in the bulk ionic liquid electrolyte. Additional experiments were done for other molar ratios, for [BMP$^+$][TFSI$^-$] ionic liquid based materials. Results are shown in Table 1 for x=1 and for x=1.5. As a reference, also the ionic conductivity values of the corresponding bulk ionic liquid electrolyte (ILE) is shown in Table 1.

TABLE 1

| molar ratio Li:ionic liquid | ionic conductivity [mS/cm] | bulk ILE | bulk ILE ionic conductivity [mS/cm] | state of bulk ILE |
|---|---|---|---|---|
| molar ratio (ionic liquid electrolyte/silica precursor) = 1 | | | | |
| 0.34:1 | 0.3 | 1 M LiTFSI | 0.7 | liquid |
| 0.78:1 | 0.6 | 1.8 M LiTFSI | 1.1 | viscous liquid |
| 1:1 | 0.6 | 3 M LiTFSI | 0.5 | solid |
| molar ratio (ionic liquid electrolyte/silica precursor) = 1.5 | | | | |
| 0.34:1 | 1 | 1 M LiTFSI | 0.7 | liquid |
| 0.67:1 | 0.5 | 1.8 M LiTFSI | 1.1 | viscous liquid |
| 1:1 | 0.4 | 3 M LiTFSI | 0.5 | solid |

It was observed that, by increasing the [Li$^+$][TFSI$^-$] concentration (by increasing the molar ratio between the Li salt and the ionic liquid) in the range reported in Table 1, the [Li$^+$][TFSI$^-$]+[BMP$^+$][TFSI$^-$] mixture (bulk ionic liquid electrolyte) went from a liquid state through viscous (sirop texture) to soft solid (texture of soft wax). Solid nanocomposite electrolyte materials comprising a silica mesoporous material with the corresponding electrolyte layer covering inner surfaces thereof were also made (using a sol-gel method in accordance with the present disclosure) with these compositions. For example, for x=1 and a (1:1) molar ratio of Li to ionic liquid a slightly higher ionic conductivity than the bulk ILE was achieved which shows that also an interface conductivity enhancement effect is obtained in this case. The results illustrate that the value of $x_{thr}$ not only depends on the materials used (as illustrated in FIG. 10 and FIG. 11), but also on the ratio between the amounts of Li and ionic liquid used in the sol-gel solution. For other ratios, the threshold value $x_{thr}$ can be determined experimentally.

In embodiments in accordance with embodiments of the present disclosure, preferably an organic salt is selected that dissolves well in the dielectric material precursor, that is not reactive with water or alcohols, that is thermally stable up to at least 180° C., that has a wide electrochemical window and a high intrinsic ionic conductivity. In preferred embodiments, the liquid salt acts as a porogen. The organic salt may be liquid at room temperature or it may have a melting temperature higher than room temperature.

When selecting a lithium salt, preferably a salt having a large polarizable anion is selected. It is an advantage of having a large polarizable anion that it has a decreased association with the Li$^+$, which may lead to an improved solvation of the Li-salt.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

It is to be understood that although preferred embodiments, specific constructions and configurations, as well as materials, have been discussed herein for devices according to the present disclosure, various changes or modifications in form and detail may be made without departing from the scope of this disclosure. For example, steps may be added or deleted to methods described within the scope of the present disclosure.

The invention claimed is:

1. A solid nanocomposite electrolyte material comprising:
   a mesoporous dielectric material comprising a plurality of interconnected pores, the plurality of interconnected pores defining inner surfaces of the mesoporous dielectric material; and
   an electrolyte layer covering the inner surfaces and forming an interface between the electrolyte layer and the inner surfaces,
   wherein the electrolyte layer comprises:
   a first layer comprising a first compound that is ionic or dipolar, the first compound comprising a first anion having a size of at least 7 nm$^3$ and a first cation that has a size greater than the first anion, wherein the first layer is adsorbed on the inner surfaces, thereby introducing or modifying a charge delocalization in the first compound and introducing or modifying a molecular dipole moment over the first compound; and
   a second layer covering the first layer, the second layer comprising a second ionic compound comprising a second anion and a second cation, wherein the second cation comprises one or more of Li$^+$, Na$^+$, K$^+$, Ca$^{2+}$, Mg$^{2+}$, Cu$^{2+}$, Al$^{3+}$, Co$^{2+}$, or Ni$^{2+}$, wherein the second layer is bound to the first layer, thereby weakening a bond between the second anion and the second cation and enhancing a mobility of the second cation or the second anion,
   wherein a molar ratio of (a) the first compound and the second ionic compound to (b) the mesoporous dielectric material is greater than a threshold value that corresponds to an ionic conductivity of the interface being greater than a bulk ionic conductivity of the electrolyte layer.

2. The solid nanocomposite electrolyte material according to claim 1, wherein the electrolyte layer further comprises an additional layer covering the second layer, the additional layer being a solvent and a conductor for the second layer.

3. The solid nanocomposite electrolyte material according to claim 1, wherein the electrolyte layer further comprises an additional layer covering the second layer, the additional layer comprising the second ionic compound.

4. The solid nanocomposite electrolyte material according to claim 1, wherein the first compound comprises an organic salt, an organic complex, a eutectic salt, or a metal salt.

5. The solid nanocomposite electrolyte material according to claim 1, wherein the first compound comprises an ionic liquid.

6. The solid nanocomposite electrolyte material according to claim 1, wherein the first anion comprises one or more of $ClO_4^-$, $BF_4^-$, $PF_6^-$, $TFSI^-$, or $BETI^-$.

7. The solid nanocomposite electrolyte material according to claim 1, wherein the mesoporous dielectric material comprises silicon oxide, aluminum oxide, or a mixture thereof.

8. The solid nanocomposite electrolyte material according to claim 1, wherein the mesoporous dielectric material has a porosity between 25% and 90%.

9. The solid nanocomposite electrolyte material according to claim 1, wherein the plurality of interconnected pores have respective diameters between 2 nm and 50 nm.

10. The solid nanocomposite electrolyte material according to claim 9, wherein the mesoporous dielectric material comprises a plurality of micropores having a diameter smaller than 2 nm.

11. The solid nanocomposite electrolyte material according to claim 1, wherein the solid nanocomposite electrolyte material has an ionic conductivity higher than 1 mS/cm.

12. A solid nanocomposite electrolyte layer comprising the solid nanocomposite electrolyte material according to claim 1.

13. The solid nanocomposite electrolyte layer according to claim 12, wherein the plurality of interconnected pores and the electrolyte layer form a continuous path for ion conduction between a first surface of the solid nanocomposite electrolyte layer and a second opposite surface of the solid nanocomposite electrolyte layer.

14. A composite ion insertion electrode comprising a mixture of an active electrode material and the solid nanocomposite electrolyte material according to claim 1.

15. A solid-state battery cell comprising the solid nanocomposite electrolyte layer according to claim 12.

16. A method for forming the solid nanocomposite electrolyte material of claim 1, wherein the method comprises:
    obtaining a solution comprising:
        a dielectric material precursor;
        the first compound;
        the second ionic compound;
        deionized water; and
        an alcohol; and
    converting the solution into a solid material by inducing gelification of the solution, thereby forming a gel and afterward drying the gel to form the solid nanocomposite electrolyte material of claim 1.

17. The solid nanocomposite electrolyte material according to claim 1, wherein the electrolyte layer is substantially continuous from a first external surface of the solid nanocomposite electrolyte material to a second external surface of the solid nanocomposite electrolyte material.

18. The method of claim 16, wherein the first compound comprises an ionic liquid.

19. The method of claim 16, further comprising forming an additional layer covering the second layer, the additional layer comprising the second ionic compound.

20. The method of claim 16, wherein the first compound comprises an organic salt, an organic complex, a eutectic salt, or a metal salt.

* * * * *